US012378817B2

(12) United States Patent
Schmick et al.

(10) Patent No.: US 12,378,817 B2
(45) Date of Patent: Aug. 5, 2025

(54) SPRING ASSIST SYSTEM

(71) Applicant: SCREENAWAY USA PTY LTD, Adelaide (AU)

(72) Inventors: Mark Schmick, Rostrevor (AU); Chris Doley, Rostrevor (AU)

(73) Assignee: UBLOCKOUT TECHNOLOGIES PTY LTD, Adelaide (AU)

( * ) Notice: Subject to any disclaimer, the term of this patent is extended or adjusted under 35 U.S.C. 154(b) by 379 days.

(21) Appl. No.: 17/908,796

(22) PCT Filed: Mar. 2, 2021

(86) PCT No.: PCT/AU2021/000022
§ 371 (c)(1),
(2) Date: Sep. 1, 2022

(87) PCT Pub. No.: WO2021/174285
PCT Pub. Date: Sep. 10, 2021

(65) Prior Publication Data

US 2023/0340834 A1 Oct. 26, 2023

(30) Foreign Application Priority Data

Mar. 2, 2020 (AU) ................................ 2020900621

(51) Int. Cl.
*E06B 9/60* (2006.01)
*E06B 9/50* (2006.01)
*E06B 9/90* (2006.01)

(52) U.S. Cl.
CPC .................. *E06B 9/60* (2013.01); *E06B 9/50* (2013.01); *E06B 2009/905* (2013.01)

(58) Field of Classification Search
CPC ........ E06B 2009/905; E06B 9/60; E06B 9/62; E06B 9/50; E06B 9/40; E06B 9/42; E06B 9/56; E06B 9/74; E06B 9/78
See application file for complete search history.

(56) References Cited

U.S. PATENT DOCUMENTS 1,726,589 A * 9/1929 Schultes .................. E06B 9/50 160/315
1,853,150 A * 4/1932 Schultes .................. E06B 9/60 188/82.9

(Continued)

FOREIGN PATENT DOCUMENTS

GB 500451 A 2/1939
WO 2013129915 A1 9/2013

*Primary Examiner* — Daniel P Cahn
*Assistant Examiner* — Jeremy C Ramsey
(74) *Attorney, Agent, or Firm* — AVEK IP, LLC; Kent R. Erickson

(57) ABSTRACT

A spring assist assembly for pre-tensioning of a helical torsion spring prior to installation in a roller screen or blind system uses a ratchet lock located at one end of a rigid tube which supports the helical torsion spring. A ratchet mechanism is provided between the ratchet lock and the torque shaft so that when a tool is inserted into an aperture in the end of the torque shaft, driving the tool drives relative rotation of a torque spindle with respect to a retaining shaft to tension the helical spring. The ratchet mechanism prevents release of the tension whilst the ratchet lock is biased towards the torque shaft. When the spring assist assembly is mounted in a support bracket, the projections of the ratchet lock disengage the ratchet lock from the torque shaft whilst the torque shaft is keyed to the support bracket to prevent rotation of the torque shaft, rigid tube and torque spindle whilst mounted in the support bracket, thereby allowing the retaining shaft to rotate with the roller tube.

20 Claims, 13 Drawing Sheets

(56) References Cited

U.S. PATENT DOCUMENTS

| | | | | |
|---|---|---|---|---|
| 4,523,620 | A | 6/1985 | Mortellite | |
| 5,031,682 | A * | 7/1991 | Tedeschi | E06B 9/60 160/315 |
| 5,036,898 | A * | 8/1991 | Chen | B60J 1/2033 160/370.21 |
| 5,226,467 | A * | 7/1993 | Lii | E06B 9/50 160/370.21 |
| 6,123,140 | A | 9/2000 | Bergamaschi | |
| 7,665,505 | B2 | 2/2010 | McCormick et al. | |
| 8,776,861 | B2 | 7/2014 | Bohlen et al. | |
| 9,080,381 | B2 | 7/2015 | Haarer et al. | |
| 9,689,201 | B2 | 6/2017 | Riemelmoser et al. | |
| 10,138,676 | B2 * | 11/2018 | Bohlen | E06B 9/90 |
| 10,138,678 | B2 | 11/2018 | Bohlen et al. | |
| 10,208,536 | B2 | 2/2019 | Riemelmoser et al. | |
| 10,781,633 | B2 | 9/2020 | Riemelmoser et al. | |
| 2005/0205224 | A1 * | 9/2005 | Dalle Nogare | E06B 9/60 160/321 |
| 2014/0096920 | A1 * | 4/2014 | MacDonald | E06B 9/80 160/405 |
| 2018/0171709 | A1 | 6/2018 | Haarer et al. | |

* cited by examiner

SPRING ASSIST SYSTEM

PRIORITY DOCUMENTS

The present application claims priority from Australian Provisional Patent Application No. 2020900621 titled "SPRING ASSIST ASSEMBLY" and filed on 2 Mar. 2020, the content of which is hereby incorporated by reference in its entirety.

TECHNICAL FIELD

The present disclosure relates to roller screen systems for covering a window or door. In a particular form the present disclosure relates to spring assistance systems for tensioning roller screens to reduce or eliminate the need for braking devices, motors or cords.

BACKGROUND

Roller screen systems (also known as roller shade systems) comprise a flexible screen (or shade) rolled around a roller tube which is driven to rotate to extend and retract the screen across a window or door opening. The roller tube thus acts as a spindle and thus the roller tube will also be referred to as a spindle or spindle tube in the following discussion. The extension and retraction of the screen over a screen opening may be directly driven by a hand grasping the cross bar/handle and manually moving the screen up or down, or by manually driving the roller tube via a cord attached to a pulley located on the end of the roller tube (spindle), or via a motor system that drives rotation of the roller tube (spindle).

As the screen is wound on and off the roller tube, the weight of the screen depending from the roller tube will vary, leading to a variable torque on the roller tube. Thus in order to ensure smoother operation of hand or cord driven systems and/or to reduce the load on the motor in motor driven systems, some systems feature a counterbalance arrangement such as a helical wound tension spring located within the roller tube to act as a counterbalance against the weight of the screen when it is unwound from or wound onto from the roller tube. These counterbalancing systems may be used in conjunction with braking systems, or may be used in standalone hand or cord driver systems. Further some systems allow pre-tensioning of the helical spring to adjust for the specific weight, spring and frictional properties of the system and thus to tune the system to maximise smooth extension and retraction of the screen.

For example GB5000451 describes using a counterbalancing system that uses two helical springs that are successively brought into operation. One end of the first spring is fixed to a stationary (i.e. non-rotating) central rod (or shaft) whilst the other end is fixed to the roller tube. This system uses an external wheel mounted at one end of the roller tube that drives rotation of the otherwise stationary central shaft to rotate one end of the helical spring relative to the outer spindle tube.

U.S. Pat. No. 10,138,676B2 describes another arrangement in which a helical spring is located over a fixed central rod (or shaft), and the spring is fixed to a spring holder at one end of the shaft and the other end is fixed to a spring winder.

This uses a helically wound tension spring coupled to a spring holder at one end and a spring winder at the other. Like GB5000451, the helically wound tension spring is interposed between a stationary central rod (or shaft) and the roller shaft, with the helically wound tension spring keyed to the stationary central rod by the spring holder at one end, and keyed at an opposite end to the roller shaft by a spring winder. A screw threaded shaft is also fixed to the central rod, and engages with a female screw thread located on the internal side of the spring winder. The spring winder is prevented from rotating via splines (projections) on the inside roller tube that engage with matching slots in the perimeter of the spring winder, so that it moves axially along the rod (like a nut) as the rod and screw threaded shaft is rotated.

Pre-tensioning is performed by using a tool (e.g. Allen key) to drive rotation of the otherwise stationary rod and the screw threaded shaft attached to the rod, to drive relative rotation of the spring winder with respect to the spring holder. This is achieved via a rod adjuster that is accommodated in an adjuster housing that is closed by a bracket connector plug, to thereby define an adjuster cavity. An Allen key or similar tool is inserted through an aperture in the bracket to a cavity in the rod adjuster to rotate the rod adjustor in a clockwise direction to adjust the stationary central rod in the same direction and thereby increase the tension of the helically wound tension spring by relative rotation of the spring holder. This allows pre-tensioning when the roller tube is mounted within the bracket.

One significant problem with this system is that the number of operational rotations is restricted by the length of the thread on the screw threaded shaft, and thus limits the drop length of the screen which prevents use on large screens and blinds. Additionally it requires specialised brackets with an aperture to allow insertion of the tool, and requires pre-tensioning to be performed with the screen/blind is in place which is not always convenient due to restricted space around the bracket. Further it is quite complex with many parts leading to increased manufacturing and assembly costs, as well as more complex maintenance. This complexity also increases the training requirements for installers to ensure that the system is both correctly installed and maintained.

Accordingly there is a need to provide an improved pre-tensioning arrangement, or at least provide a useful alternative to existing counterbalancing/pre-tensioning systems for screen systems.

SUMMARY

According to a first aspect, there is provided a spring assist assembly for a roller tube comprising:
- a rigid tube having a proximal end and a distal end;
- a tube adapter with proximal end and an outer tubular surface configured for insertion into a proximal end of a roller tube, and the proximal end comprises a central aperture and one or more peripheral apertures located between the central aperture and the proximal end of the outer tubular surface;
- a torque shaft passing through the central aperture of the tube adapter and comprising a drive tool aperture at a proximal end, a shaft at a distal end, and a first mating surface;
- a linkage which rigidly connects the distal end of the torque shaft to the proximal end of the rigid tube;
- a helical spring located over the rigid tube;
- a proximal spring anchor;
- a distal spring anchor located over the rigid tube;
- a retainer which is rigidly attached to the tube adapter;
- a ratchet lock fitted over the shaft of the torque shaft comprising one or more proximal projections which extend through the one or more peripheral apertures in the tube adapter, one or more radial projections which are received in apertures in the retainer and a second mating surface, wherein the torque shaft, linkage and rigid tube are configured to rotate relative to the tube adapter and retainer, and the spring assembly is configured to allow relative rotation of the proximal spring anchor with respect to the distal spring anchor, and a ratchet mechanism is provided between the first mating surface of the torque shaft and the second mating surface of the ratchet lock such that when a tool is inserted into the drive tool aperture, driving the tool drives relative rotation of the proximal spring anchor with respect to the distal spring anchor to tension the helical spring, and the ratchet lock is biased to engage with the torque shaft to retain added tension, and when the spring assist assembly is mounted in a support bracket, the one or more projections of the ratchet lock are distally displaced to separate the first and second mating faces to release the ratchet mechanism to allow the spring tension to increase or decrease as the roller tube rotates with respect to the rigid tube.

In one form, the spring assembly is configured to allow relative rotation of the proximal spring anchor with respect to the distal spring anchor by attaching the proximal spring anchor to the linkage and the distal spring anchor is configured to allow relative rotation of the distal spring anchor with respect to the rigid tube, and the tube adapter and distal spring anchor are configured to key with the inner surface of the roller tube to co-rotate with the roller tube when installed in the roller tube.

In a further form, the rigid tube has a non-circular cross section, and the distal spring anchor has a circular aperture through with the rigid tube passes with a diameter greater than or equal to the largest dimension of the rigid tube so that the rigid tube can rotate with respect to the distal spring anchor.

In a further form, the inner surface of the roller tube comprises a plurality of axially extending splines distributed around the perimeter of the roller tube, and the tube adapter and distal spring anchor comprise a plurality of matching slots to receive the splines to key the tube adapter and distal spring anchor to the roller tube.

In a further form, the linkage comprises a joiner and a latch where the joiner is configured to rigidly connect to the distal end of the torque shaft and to the proximal end of the latch, and the proximal end of the latch is configured to receive the rigid tube, and the proximal spring anchor is located on the proximal end of the latch.

In one form, the spring assembly is configured to allow relative rotation of the proximal spring anchor with respect to the distal spring anchor by attaching the proximal spring anchor to the retainer and the distal spring anchor is configured to rotate with the rigid tube.

In a further form, the rigid tube has a non-circular cross section, and the distal spring anchor has a matching non-circular aperture through which the rigid tube passes so that the proximal spring anchor rotates with the rigid tube.

In a further form, the linkage comprises a joiner which is configured to rigidly connect the distal end of the torque shaft to a proximal end of the rigid tube and the rigid tube has a non-circular cross section, and the retainer has a circular aperture through which the rigid tube passes with a diameter greater than or equal to the largest dimension of the rigid tube so that the rigid tube can rotate with respect to the retainer.

In a further form, the spring assist assembly further comprises a ball bearing located between the joiner and retainer.

In a further form, the peripheral end of the tube adapter comprises a rim in which the central aperture and one or more peripheral apertures are located, and one or more pairs of projections wherein each pair of projections is located adjacent each of the one or more peripheral apertures.

In a further form, the peripheral end of the tube adapter comprises a rim, and a proximal end cavity comprising an annular inner wall extending distally from the rim to an inner end surface in which the central aperture and one or more peripheral apertures are located, and wherein the annular inner wall comprises a plurality of ribs which in use are configured to key the tube adapter to a pulley mounted in a support bracket.

According to a second aspect there is provided a screen system comprising:

a frame;

a first support bracket and a second support bracket;

a roller tube supporting a screen wound onto the roller tube, and mounted on the first support bracket and the second support bracket, and comprising the spring assist assembly of the first aspect.

In one form, the first support bracket comprises a pulley mounted in the bracket via a bearing arrangement and the pulley further comprises an annular tube mounting projection with external slots that will mate and key into ribs on the annular inner wall of the tube adapter, and the annular mounting projection is further configured to distally displace the one or more projections of the ratchet lock to release the ratchet mechanism.

In a further form, the bracket further comprises an outer mounting projection and the bearing arrangement is supported by the outer mounting projection, and the bracket further comprises an inner mounting projection and a spring is mounted over the inner mounting projection and distally biases the torque shaft, and a stub torque shaft is mounted over the spring and between the inner and outer mounting projections, such that in use, rotation of the pulley will rotate the roller tube and tube adapter in the direction of the pulley whilst the stub torque shaft holds the torque shaft and rigid tube fixed and thus wind or unwind the helical spring to counterbalance the changing weight of the screen.

In one form, the first support bracket comprises a pulley mounted in the bracket via a bearing arrangement, and the pulley further comprises an inner wall located on the distal side of the pulley which forms one or more pairs of receiving cavities which are divided by a projecting wedge component formed on the distal surface of the pulley and the one or more receiving cavities are configured to receive the one or more pairs of projections such that the projecting wedge component distally displaces the one or more projections of the ratchet lock to release the ratchet mechanism.

BRIEF DESCRIPTION OF DRAWINGS

Embodiments of the present disclosure will be discussed with reference to the accompanying drawings wherein.

DESCRIPTION OF EMBODIMENTS

Figure 1A:
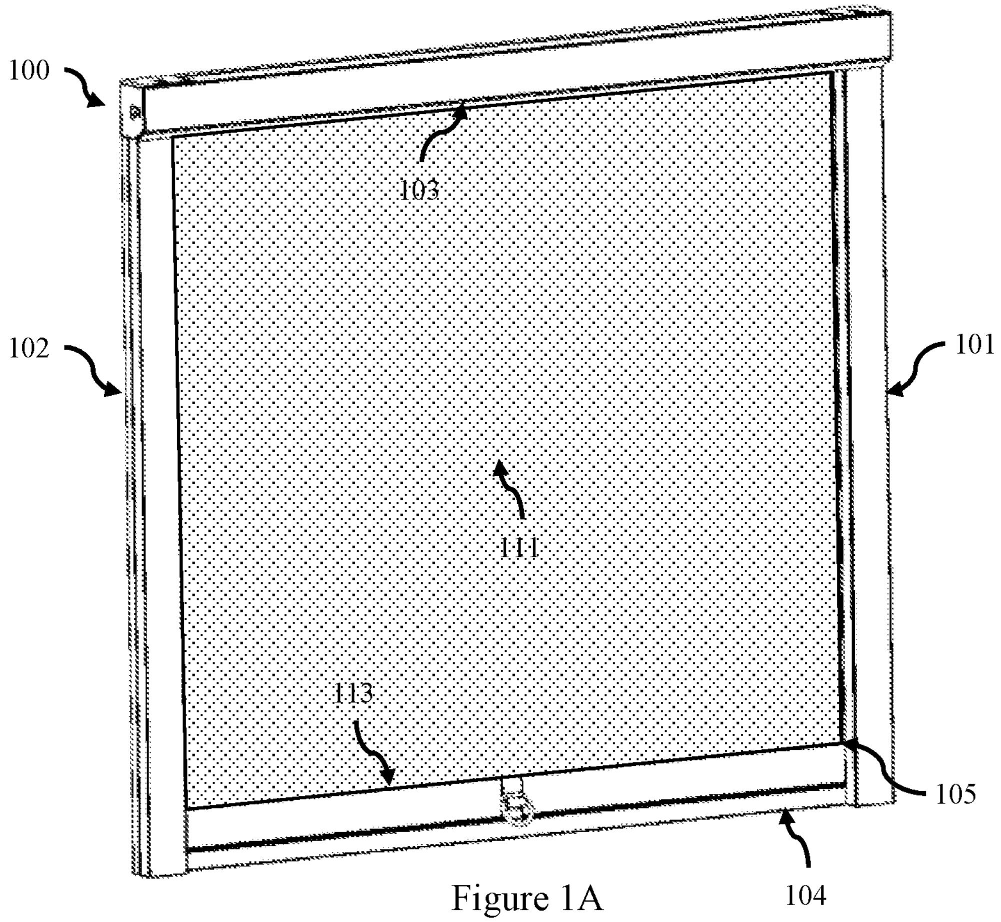
FIG. 1A is a perspective view of roller screen system according to an embodiment.
Figure 1B:
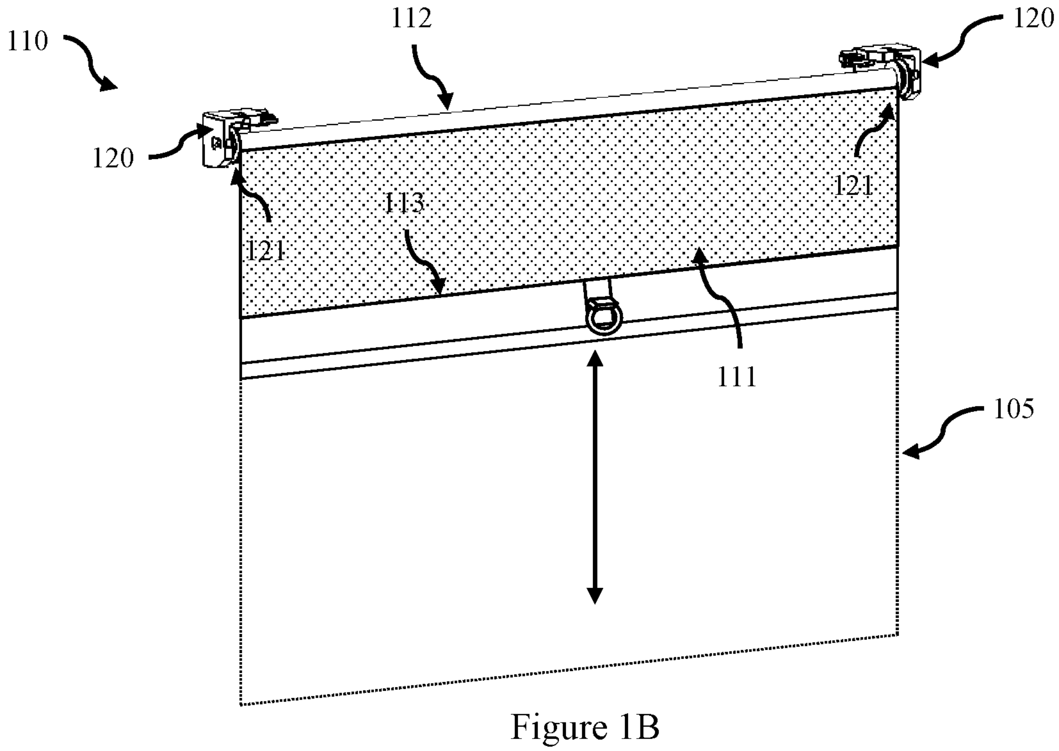
FIG. 1B is a perspective view of the screen assembly of FIG. 1A with the exterior cover members removed to show the spindle, screen and support brackets according to an embodiment.

An embodiment of a roller screen system 100 is shown in FIG. 1A. This system comprises a screen support assembly which is inserted into a window frame or similar aperture (e.g. door). The screen support assembly is a screen frame comprising a pair of screen side members 101 and 102, and a screen spindle frame member 103 and a screen distal frame member 104 which when assembled define a screen opening. In the following description the terms proximal and distal are defined with respect to the spindle axis. The screen support assembly 100 provides a mount for a roller assembly 110 that comprises a screen 111 wound around a rotatably mounted roller tube (or spindle) 112, as shown in FIG. 1B. The roller tube (spindle) 112 is mounted via brackets 120 so that the rotation (spindle) axis is parallel with the screen spindle frame member 103 so that it is adjacent to the screen opening. The screen 111 may comprise a mesh material, a semi-opaque or opaque material or a block-out material and when fully extended the screen 111 covers the screen opening 105. The screen may also be referred to as a blind. The roller tube (spindle) can be driven by a motor or cord attached to an end of the roller tube (e.g. via a pulley mounted in a bracket 120) to extend or retract the screen 111 across the screen opening, or driven by hand, such as by grasping the distal edge 113 of the screen.

Several embodiments of a spring assist assembly which fit within the roller tube 112 will now be described. These include a rigid tube 18 which supports a helical spring 19, and when installed in the bracket they are configured so that one end of the helical spring 19 is fixed relative to the other end, so that the tension in the spring can be adjusted to counterbalance the changing weight of the screen (as it is raised or lowered). The spring assist is configured to allow pre-tensioning of the helical spring prior to installation, and uses a ratchet mechanism formed between a torque shaft and a ratchet lock which is engaged with a tube adapter that is inserted into one end (the proximal end) of the roller tube 112. The torque shaft comprises an aperture to receive a drive tool such as an Allen key and various embodiments are described in which the drive tool drives relative rotation of one end of the spring with respect to the other end of the spring to add (or remove) tension in the helical spring, and the ratchet lock is biased to engage with the torque shaft to retain the added tension prior to installation of the spring assist assembly and roller tube in the support bracket. When the spring assist assembly and the roller tube are inserted in the support bracket, the pulley comprises a component or projection which displaces the ratchet lock to disengage the ratchet mechanism.

Figure 2A:
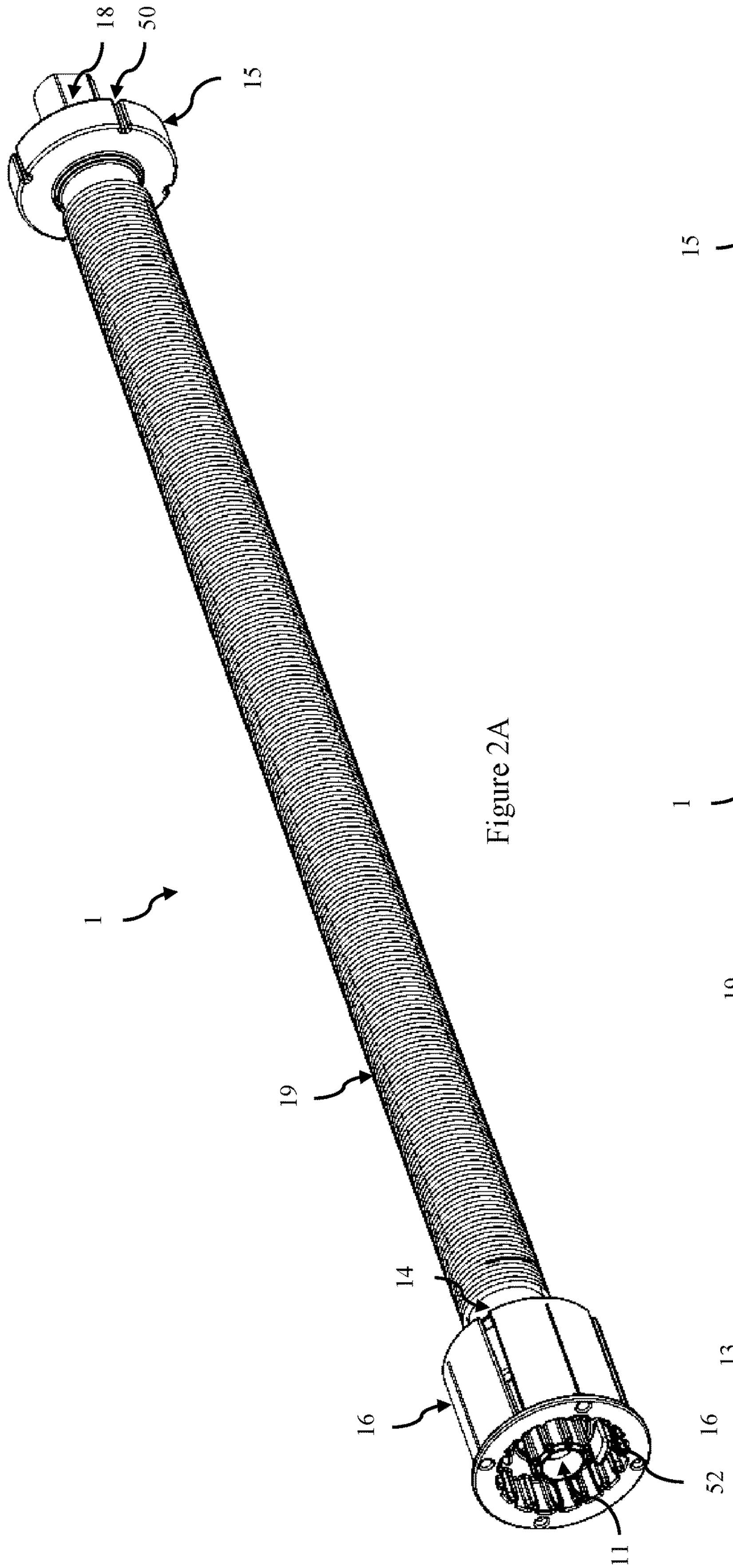
FIG. 2A is an isometric view of the spring assist assembly according to an embodiment.
Figure 2B:
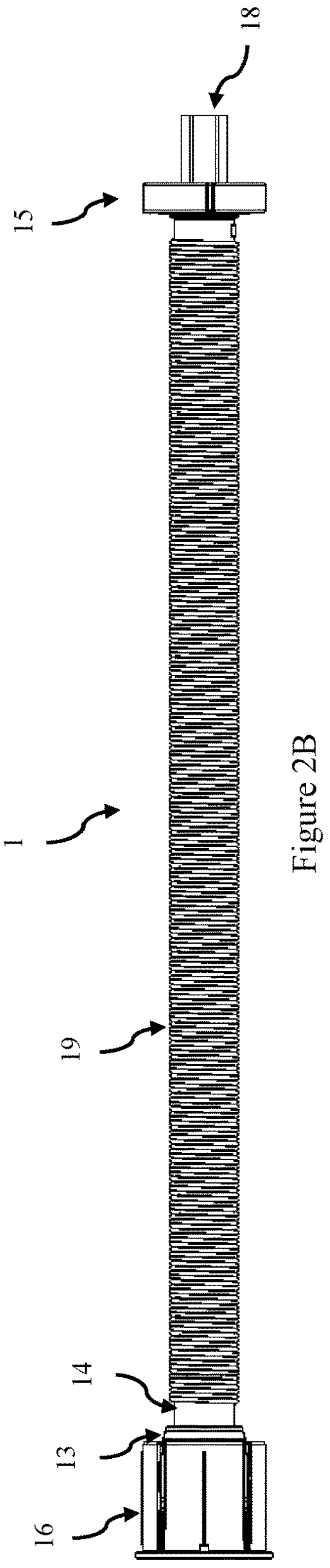
FIG. 2B is a side view of the spring assist assembly of FIG. 2A.
Figure 2C:
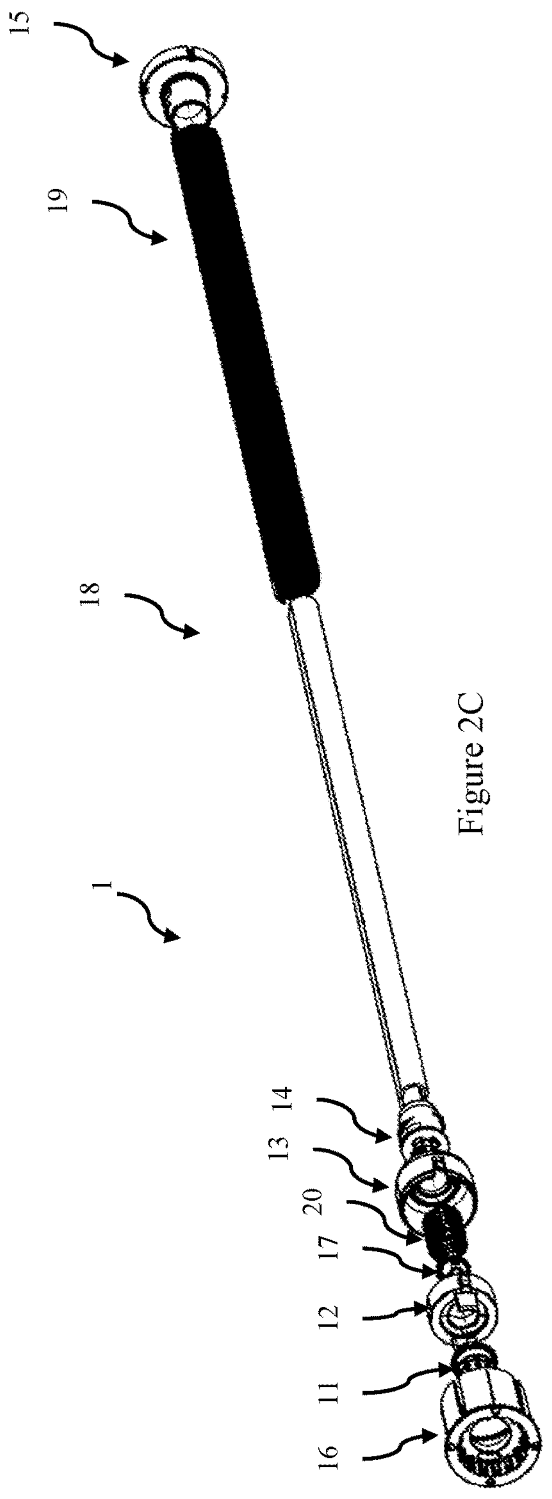
FIG. 2C is an exploded perspective view of the spring assist assembly of FIG. 2A.
Figure 2D:
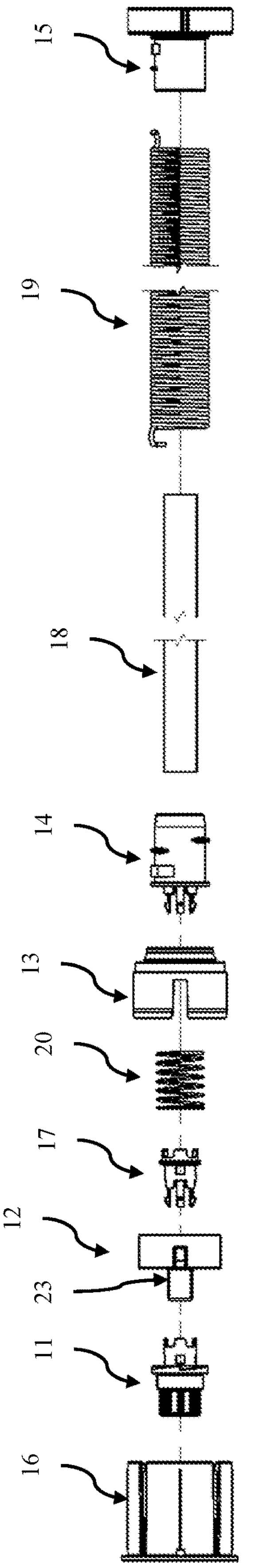
FIG. 2D is an exploded side view of the spring assist assembly of FIG. 2A.
Figure 2E:
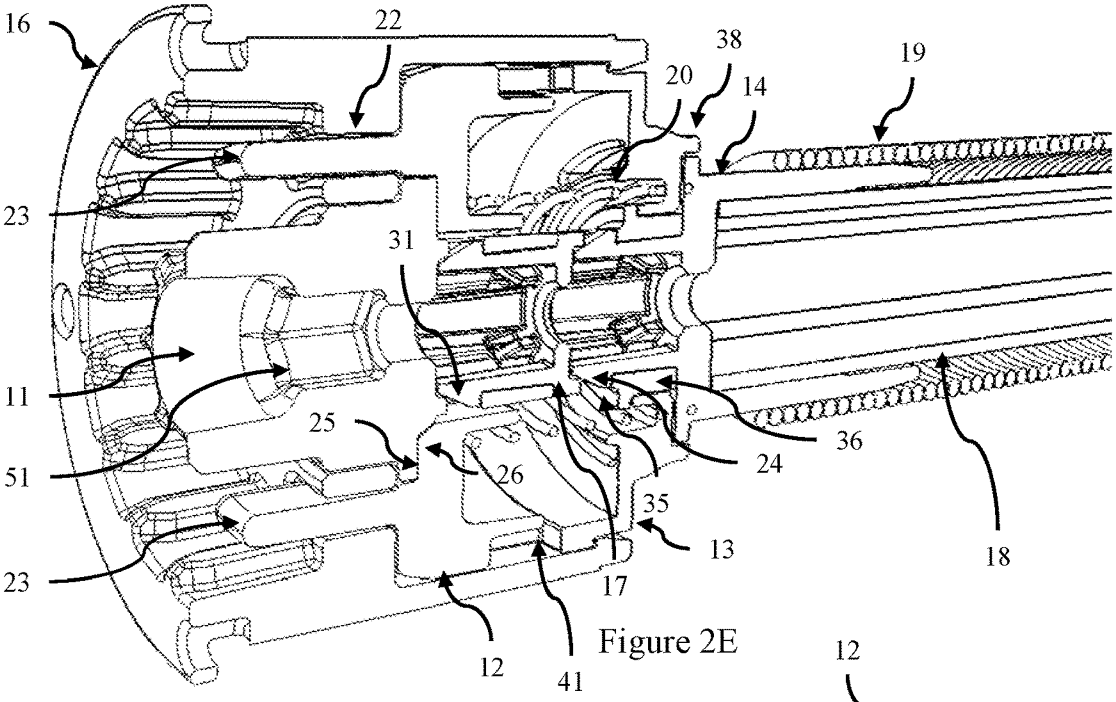
FIG. 2E is an perspective sectional view through a first end of the spring assist assembly of FIG. 2A.
Figure 2F:
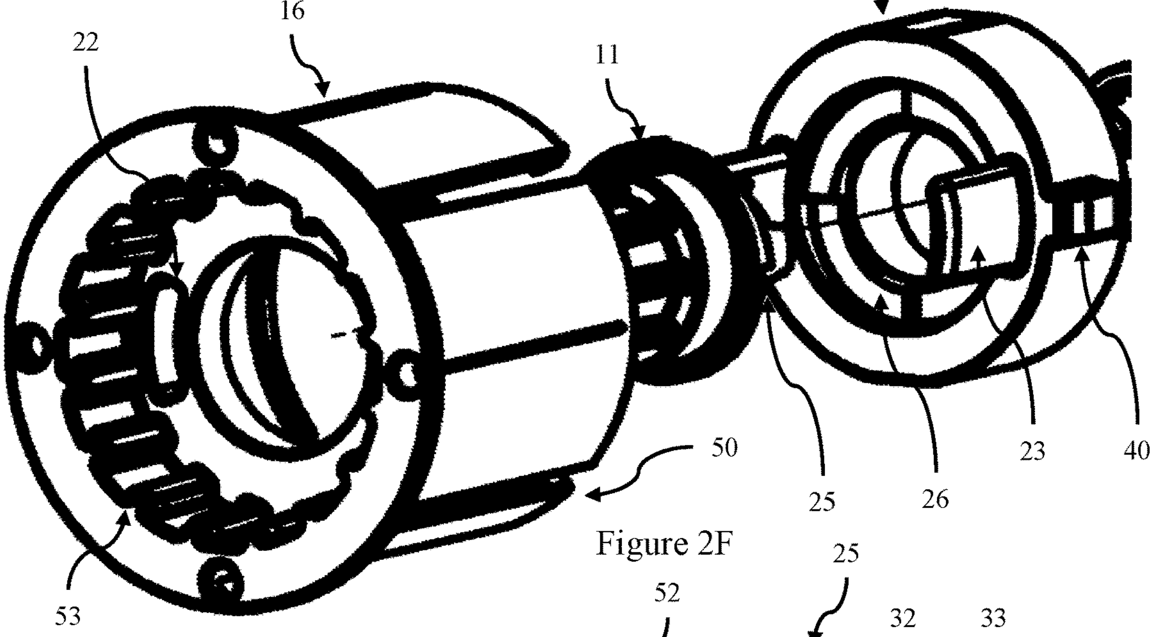
FIG. 2F is a close up exploded perspective view of the tube adapter, torque shaft and lock components shown in FIG. 2C.
Figure 2G:
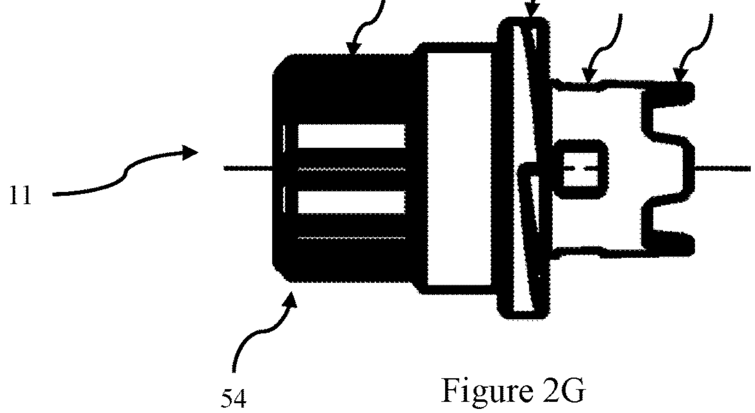
FIG. 2G is a close up side view of the torque shaft shown in FIG. 2D.
Figure 2H:
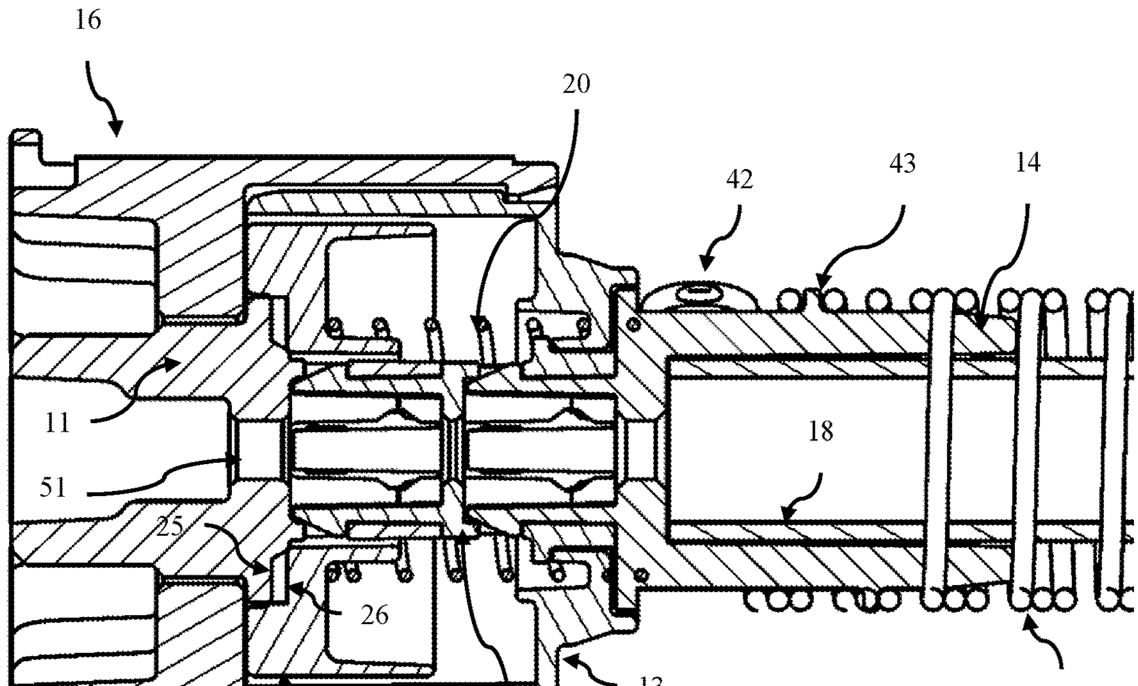
FIG. 2H is a sectional view of a first end of the spring assist assembly of FIG. 2A.
Figure 2K:
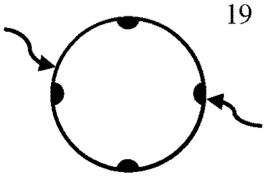
FIG. 2K is a cross sectional view of the spindle according to an embodiment.
Figure 2I:
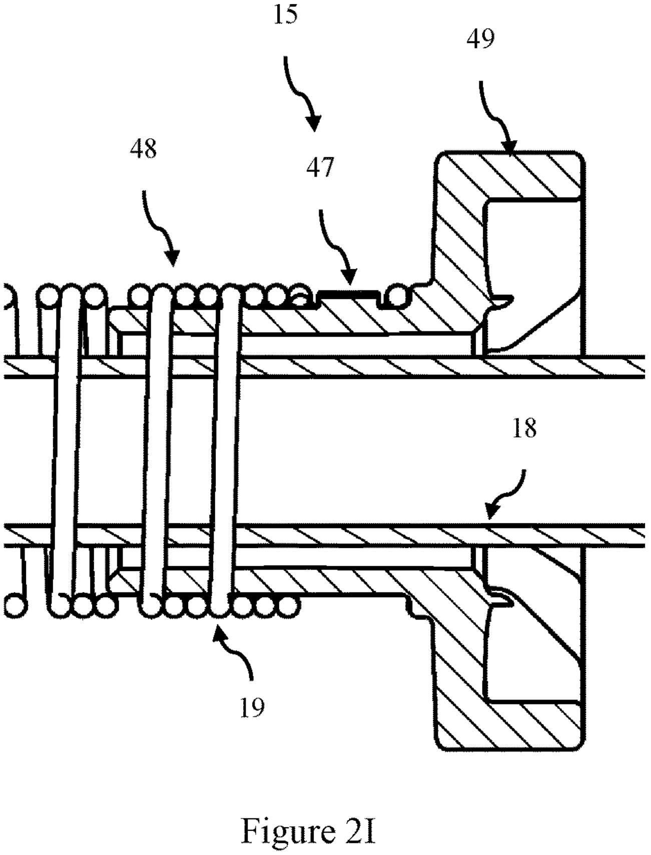
FIG. 2I is a sectional view of a second end of the spring assist assembly of FIG. 2A.
Figure 2J:
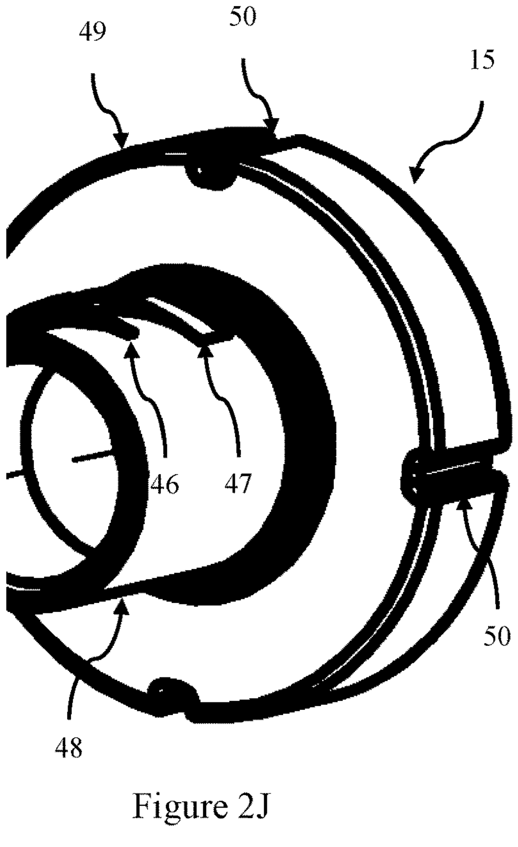
FIG. 2J is a close up perspective view of the drive shown in FIG. 2D.

FIGS. 2A and 2B are an isometric and side view of a first embodiment of spring assist assembly 1. The spring assist assembly is located within the spindle (or roller) tube 112 of FIG. 1B and is designed to allow the spring assist assembly to self-retain any pre-spring tension applied to it once fitted into a compatible splined spindle (or roller) tube. This makes it simple to set, and adjust pre-tension as desired. The components of the spring assembly are further illustrated in FIGS. 2C and 2D which are exploded perspective and side views of the spring assist assembly of FIG. 2A. FIG. 2E is a perspective sectional view through a first end of the spring assist assembly of FIG. 2A. FIG. 2F is a close up exploded perspective view of the tube adapter, torque shaft and lock components shown in FIG. 2C. FIG. 2G is a close up side view of the torque shaft shown in FIG. 2D. FIG. 2H is a sectional view of a first end of the spring assist assembly of FIG. 2A. FIG. 2I is a sectional view of a second end of the spring assist assembly of FIG. 2A. FIG. 2J is a close up perspective of the drive shown in FIG. 2D.

In this embodiment the interior of the roller/spindle tube 112 comprises four internal axially extending splines located at each compass point around the perimeter. FIG. 2A shows tube adapter 16 located at a first proximal end of the roller tube 112. The outer tubular surface of the tube adapter 16 is configured to key into the compatible splined tube 112 via four slots in the outer tubular surface which receive the four internal splines to ensure that tube adapter 16 and spindle tube 112 rotate together. A helical torsion spring 19 is located over a rigid tube 18 that extends from a proximal spring anchor at a proximal end (on latch 14 in this embodiment), to a distal spring anchor on a drive 15 (or drive component) located at the other distal end and is also keyed into the compatible splined spindle (roller tube) 112 via four slots 50 which receive the four internal splines 56 on the interior surface of the roller tube 112 to ensure that only one end of the spring 19 can rotate. A cross sectional view of the spindle 112 showing the four splines 56 is shown in FIG. 2K. In this embodiment distal and proximal will be defined relative to the tube adapter end, and thus the proximal spring anchor is located at the proximal end (on latch 14 in this embodiment) the distal spring anchor is provided by drive 15. In other embodiments, alternative keying arrangements could be used. For example the interior surface of the roller tube could include slots, and the outer surface of the tube adapter 16 and drive 15 could have radially outwardly directed projections which are received in the slots.

In this embodiment the rigid tube 18 has a rectangular profile with bevelled edges. The drive 15 has a circular aperture through which the rigid tube passes with a diameter greater than or equal to a largest dimension of the rigid tube 18 so that the rigid tube can rotate with respect to the drive 15.

The first end of spring assist assembly comprises a tube adapter 16, a torque shaft 11, a ratchet lock 12, a joiner 17, a compression spring 20, a retainer 13, and a latch 14.

The interior of the proximal end of the tube adapter 16 comprises a proximal end cavity defined by an annular inner wall that extends distally from the rim (on the proximal end) to an inner end surface (or flange) with a circular aperture through which a first proximal end 54 of the torque shaft 11 projects through. The annular inner wall surface comprises a plurality of ribs 53 that are distributed around the cavity, and which are designed to key with matching slots in the pulley in the support bracket to key the tube adapter to the pulley. The exterior of the first proximal end 54 of the torque shaft comprises a plurality of ribs. The flange comprises two apertures 22 configured to receive proximal projections 23 from ratchet lock 12 which key the ratchet lock to the tube adapter 16. The exterior surface of the tube adapter 16 comprises slots 50 to match splines 56 in the interior of the spindle 112.

The torque shaft 11 is connected to, and drives a linkage which in this embodiment is comprised of the joiner 17 and the latch 14, which in turn rotates one end of the torsion spring 19, adjusting pre-tension. As described above drive 15 is keyed into the compatible splined tube 112 to ensure that only one end of the spring 19 can rotate. The torque shaft 11 comprises a central first mating surface 25 and distal connecting portion 33 with apertures 32 which receive clips 31 extending from the proximal end of the joiner 17. The distal end 36 of the joiner 17 comprises apertures 35 which receives clips 24 extending from the proximal end of the latch 14. The ratchet lock 12 is an annular piece with a second mating face 26. Two proximally extending projections 23 key the ratchet lock to the tube adapter 16, and two radially/outwardly directed projections 40 key the ratchet lock into slots 41 in retainer 13. Thus the tube adapter 16, ratchet lock 12 and retainer 13 are keyed together. The retainer 13 comprises a central aperture with a flanged distal end 38 which a proximal rim of the latch 14 abuts. The distal end of the latch is tubular and shaped to receive the tube 18, which has an approximately rectangular profile. The spring 19 is proximally attached on the exterior of the tubular distal end of latch 14 via a proximal spring anchor formed from guides 43 and attachment point 42. At the distal end of the tube 18 the drive 15 comprises a tubular spring attachment portion 48 comprising guides 46 and spring attachment point 47. A distally located flange 49 has a diameter matched to the spindle tube diameter with slots 50 to key into splines 56 located on the inside of the spindle tube 112.

The first mating faces 25 and 26 between the torque shaft 11 and the ratchet lock 12 are shaped to create a ratchet mechanism. The compression spring 20, provides a constant spring tension to the ratchet mechanism to ensure that any added tension is retained in the system. The ratchet lock 12 is keyed into both the retainer 13, and the tube adapter 16. The tube adapter 16 is keyed into the compatible splined tube to ensure that they rotate together. When functioning, the torque shaft 11 is keyed into an external stationary part via ribs 52 while the ratchet lock 12 is pushed inwards against the compression spring 20 by an external compatible part that pushes the projections 23 in a distal direction to release the ratchet mechanism (i.e. separate mating faces 25 and 26) and allowing the spring tension to increase or decrease as the compatible splined tube rotates.

To add pre-tension, a key, such as an Allen key is inserted into key aperture 51 and is used to rotate the torque shaft 11 clockwise. To decrease tension, the ratchet lock 12 is pushed in while a key is used to rotate the torque shaft 11 counter-clockwise. Alternatively, the spring assist assembly 1 can be removed from the compatible splined tube 112 to reset the pre-tension to zero.

The spring assist assembly may be assembled as follows. Ratchet lock 12 is slipped over torque shaft 11. Joiner 17 is keyed and clipped into torque shaft 11. The compression spring 20 is slipped over joiner 17, and located against the ratchet lock 12. The retainer 13 is located against the compression spring 20. The latch 14 is inserted through the retainer 13 and keyed and clipped into the joiner 17, locking the assembly together axially to this point. The rigid tube 18 is press fit into the latch 14. The torsion spring 19 is attached on one end to the drive 15. The torsion spring 19 and the drive 15 are slipped over the rigid tube 18, with the reaming free end of the torsion spring 19 being attached to the latch 14. The tube adapter 16 is slipped over the torque shaft 11 and clipped over the retainer 13, while the ratchet lock 12 locates into the tube adapter 16.

In one embodiment the torsion spring 19 is a Ø22×375 mm torsion spring, and the compression spring 20 is a Ø18×22 mm compression spring. However in other embodiments different diameter and length torsion and compression springs may be used based on the diameter of the spindle and length of the roller tube.

The benefits of this embodiment are that it allows pre-tension to be applied and self-retained when fitted inside a compatible splined tube 112. Further the system is designed so that there is no limit to the number of rotations, and thus the amount of tension to be applied. This has the advantage of enabling use of the system on large screens or blinds with long drop lengths. That is, unlike some prior art systems which use a screw threaded shaft which limits the number of rotations that can be applied, there is no restriction on the drop length or size of the screens to which tension is applied. Further it simplifies the install process by removing the need for technical knowledge and training to set and install pre-tension. It only requires very basic instruction on how to set and release the tension. Further the spring assist assembly will retain set pre-tension unless removed from compatible splined tube 112.

Figure 3A:
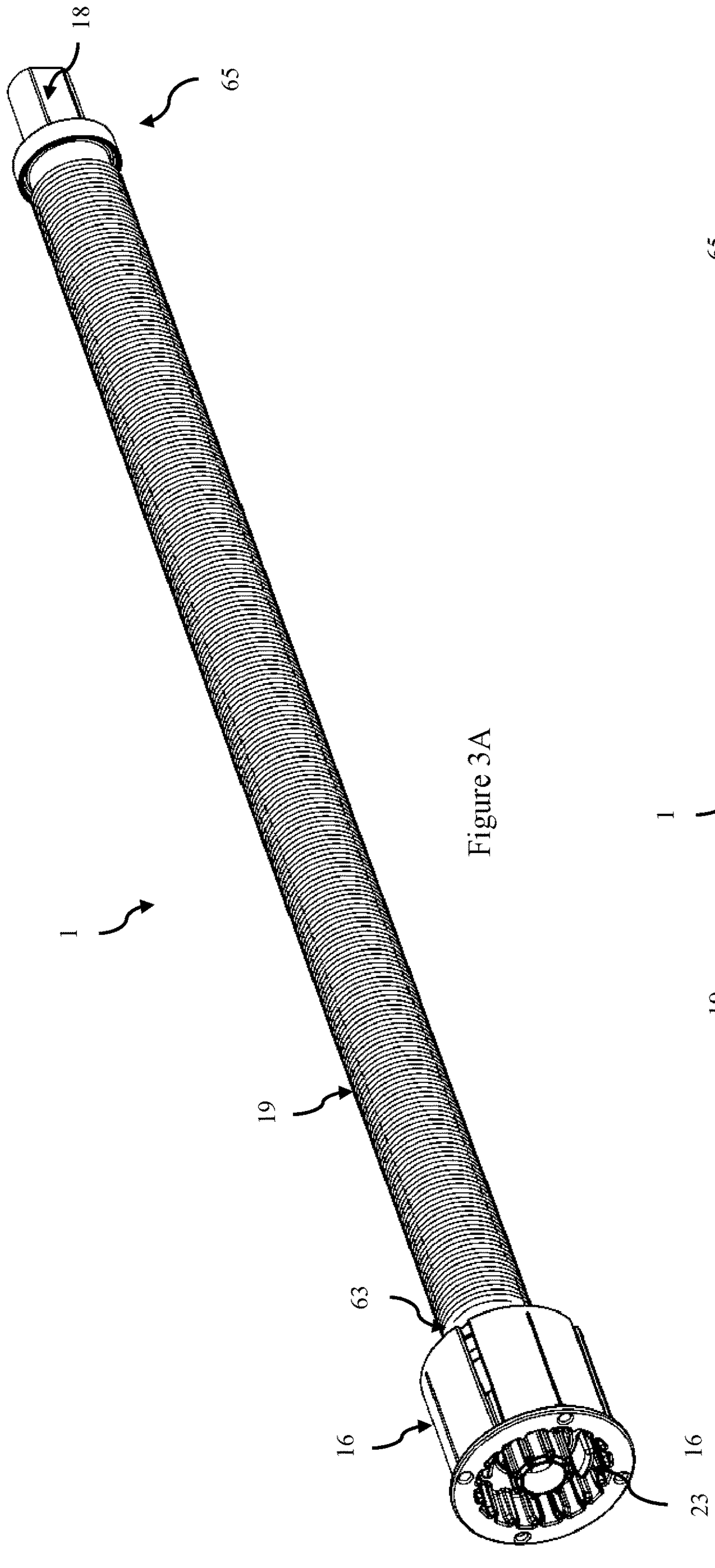
FIG. 3A is an isometric view of the spring assist assembly according to another embodiment.
Figure 3B:
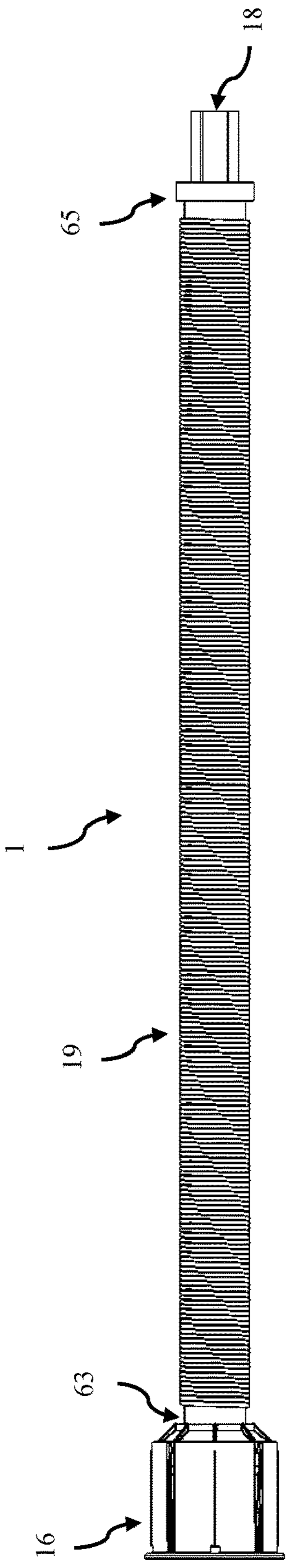
FIG. 3B is a side view of the spring assist assembly of FIG. 3A.
Figure 3C:
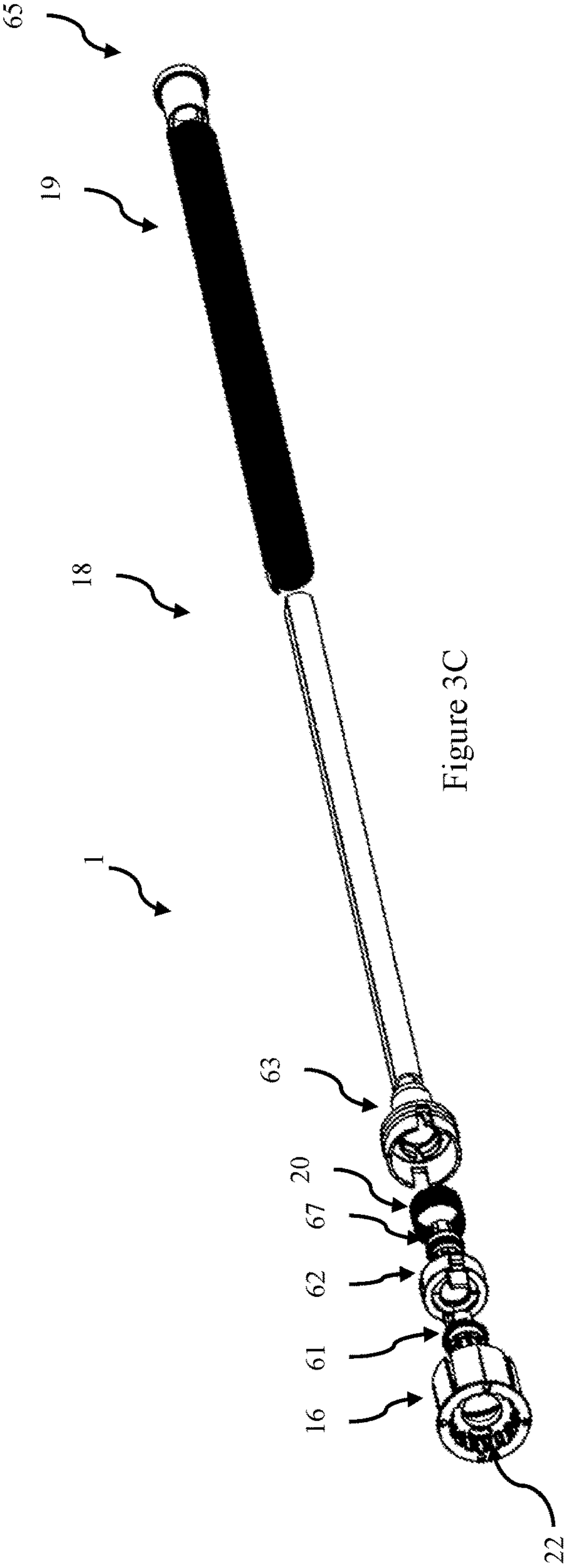
FIG. 3C is an exploded perspective view of the spring assist assembly of FIG. 3A.
Figure 3D:
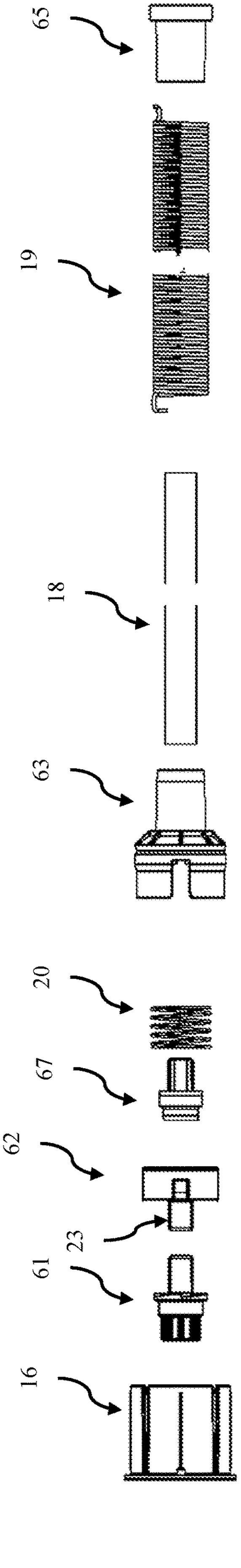
FIG. 3D is an exploded side view of the spring assist assembly of FIG. 3A.
Figure 3E:
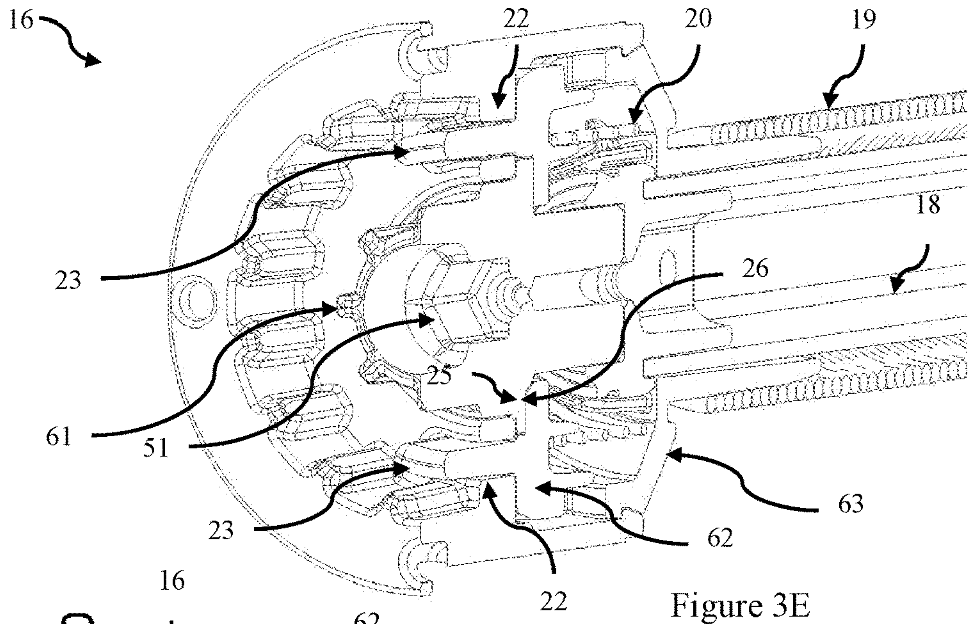
FIG. 3E is a perspective sectional view through a first end of the spring assist assembly of FIG. 3A.
Figure 3F:
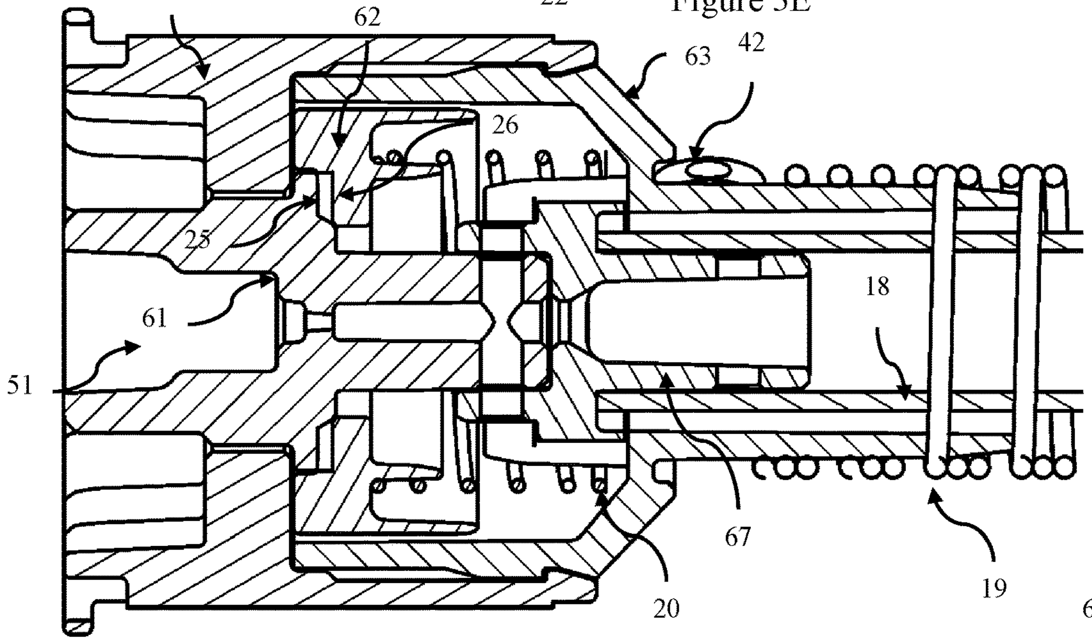
FIG. 3F is a sectional view of a first end of the spring assist assembly of FIG. 3A.
Figure 3G:
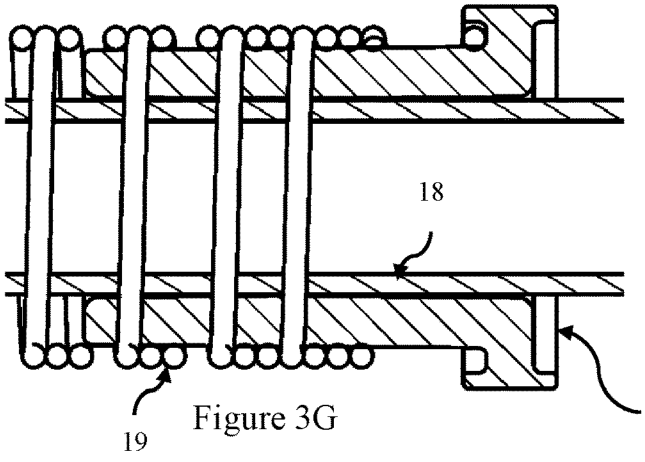
FIG. 3G is a sectional view of a second end of the spring assist assembly of FIG. 3A.
Figure 3H:
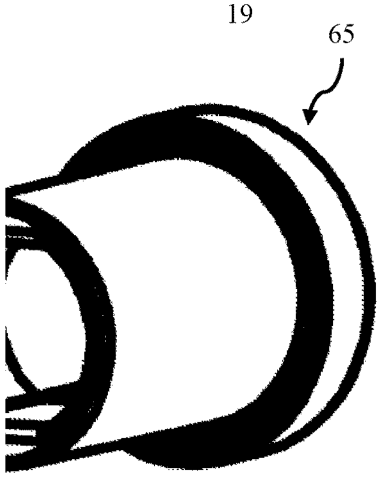
FIG. 3H is a close up perspective view of the torque spindle component shown in FIG. 3D.

FIGS. 3A to 3H show another embodiment of a spring assist assembly. FIGS. 3A and 3B are an isometric and side view of the spring assist assembly. FIGS. 3C and 3D are an exploded perspective and side view of the spring assist assembly of FIG. 3A. FIG. 3E is a perspective sectional view through a first end of the spring assist assembly of FIG. 3A. FIG. 3F is a sectional view of a first end of the spring assist assembly of FIG. 3A. FIG. 3G is a sectional view of a second end of the spring assist assembly of FIG. 3A. FIG. 3H is a close up perspective view of the torque spindle component shown in FIG. 3D.

In this embodiment the drive end is switched from the distal end to the proximal end, and changing the idle end that is connected inline rotationally to the torque shaft from the proximal to the distal end. This has the advantage of rotationally connecting the drive and the tube adapter 16 without the need for the external tube 112 (i.e. this does not need to have internal splines as shown in FIG. 2K). This has been achieved with a new retaining shaft 63 which is keyed into the tube adapter 16. Like the first embodiment, this embodiment also allows unrestricted rotations enabling applying of tension for even large screens and blinds (i.e. unlike some prior art systems there is no limitation on the drop length of the screens and blinds).

There are a number of part changes between the first embodiment and the second embodiment. In the second embodiment, retaining shaft 63 replaces drive 15 and retainer 13 and combines their functions into a single part. The torque spindle 65 replaces and is a variant of latch 14. This basically turns this part around to run at the other end of the rigid tube 18. The joiner 67 is modified to mount the rigid tube 18 and the torque spindle 65 fits over the rigid tube 18. In this embodiment the linkage is thus provided by joiner 67. As in the previous embodiment the rigid tube 18 has an rectangular profile with bevelled edges. The torque spindle 65 has a circular aperture through which the rigid tube 18 passes with a diameter greater than or equal to the largest dimension of the rigid tube 18 so that the rigid tube can rotate with respect to the torque spindle 65. In this embodiment the distal spring anchor is provided on retaining shaft 63 and the distal spring anchor is provided by the torque spindle 65.

The torque shaft 61 is connected inline to, and drives, the joiner 67, the rigid tube 18, and the torque spindle 65, which in turn rotates one end of the torsion spring 19, adjusting pre-tension. The mating faces between the torque shaft 61 and the ratchet lock 62 are shaped to create a ratchet mechanism. The compression spring 20, provides a constant spring tension to the ratchet mechanism to ensure that any added tension is retained in the system. The ratchet lock 62 is keyed into both the retaining shaft 63, and the tube adapter 16. When in use, the tube adapter 16 is keyed into a compatible splined tube to ensure that they rotate together, and the torque shaft 61 is keyed into an external compatible stationary part, while the ratchet lock 62 is pushed inwards against the compression spring 20 by an external compatible part, releasing the ratchet mechanism and allowing the spring tension to increase or decrease as the tube adapter 16 rotates.

To add pre-tension, a key, such as an Allen key is inserted into key aperture 51 and is used to rotate the torque shaft 61 clockwise. To decrease tension, the lock 62 is pushed in while a key is used to rotate the torque shaft 61 counter-clockwise. Alternatively, the torque spindle 65 can be removed from the rigid tube 18 to reset the pre-tension to zero.

The benefits of this embodiment are that it allows pre-tension to be applied and fully self-retained with no external assistance, and does not require a splined tube 112. Further it simplifies the install process by removing the need for technical knowledge and training to set and install pre-tension. It only requires very basic instruction on how to set and release the tension. This version also has fewer parts assisting in reducing costs and complexity. Also, like the first embodiment, this embodiment allows unrestricted rotations enabling applying of tension for even large screens and blinds (i.e. unlike some prior art systems there is no limitation on the drop length of the screens and blinds).

The spring assist may be assembled as follows. Ratchet lock 62 is slipped over torque shaft 61. Joiner 67 is interference fit into a mating drive on torque shaft 61. Compression spring 20 is slipped over joiner 67, and located against the ratchet lock 62. The rigid tube 18 is interference fit onto a mating drive on the joiner 67. The torsion spring 19 is attached on one end to the retaining shaft 63 and to the torque spindle 65 on the opposite end. The retaining shaft 63, torsion spring 19, and torque spindle 65, are slipped over the rigid tube 18, with the torque spindle 65 keying onto the rigid tube 18, mating rotation but allowing axial movement. The retaining shaft 63 is located against the compression spring 20, keyed into the ratchet lock 62, and clipped over the joiner 67, locking the assembly together axially. The tube adapter 16 is slipped over the torque shaft 61 and clipped over the retaining shaft 63, while the ratchet lock 62 locates into the tube adapter 16.

Figure 4A:
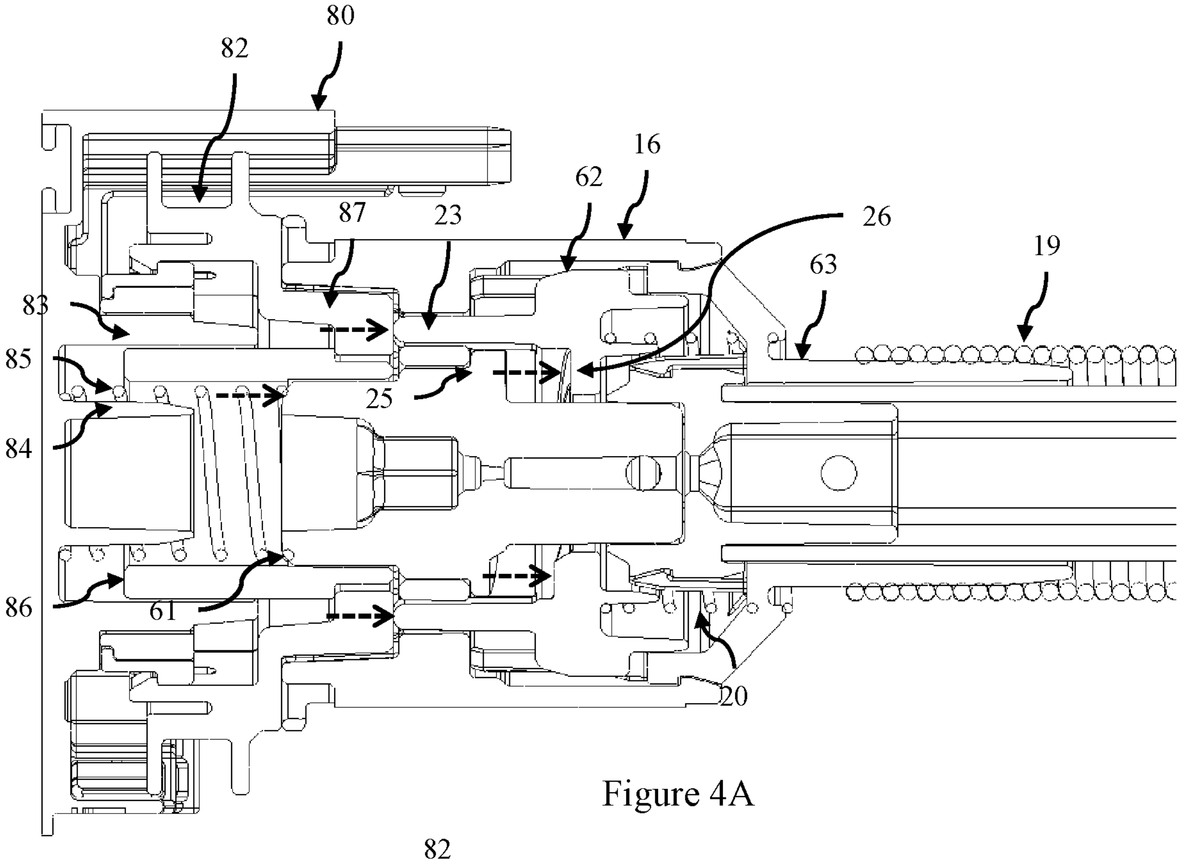
FIG. 4A is a side sectional view of the spring assist assembly of FIG. 3A mounted in a corner bracket according to an embodiment.
Figure 4B:
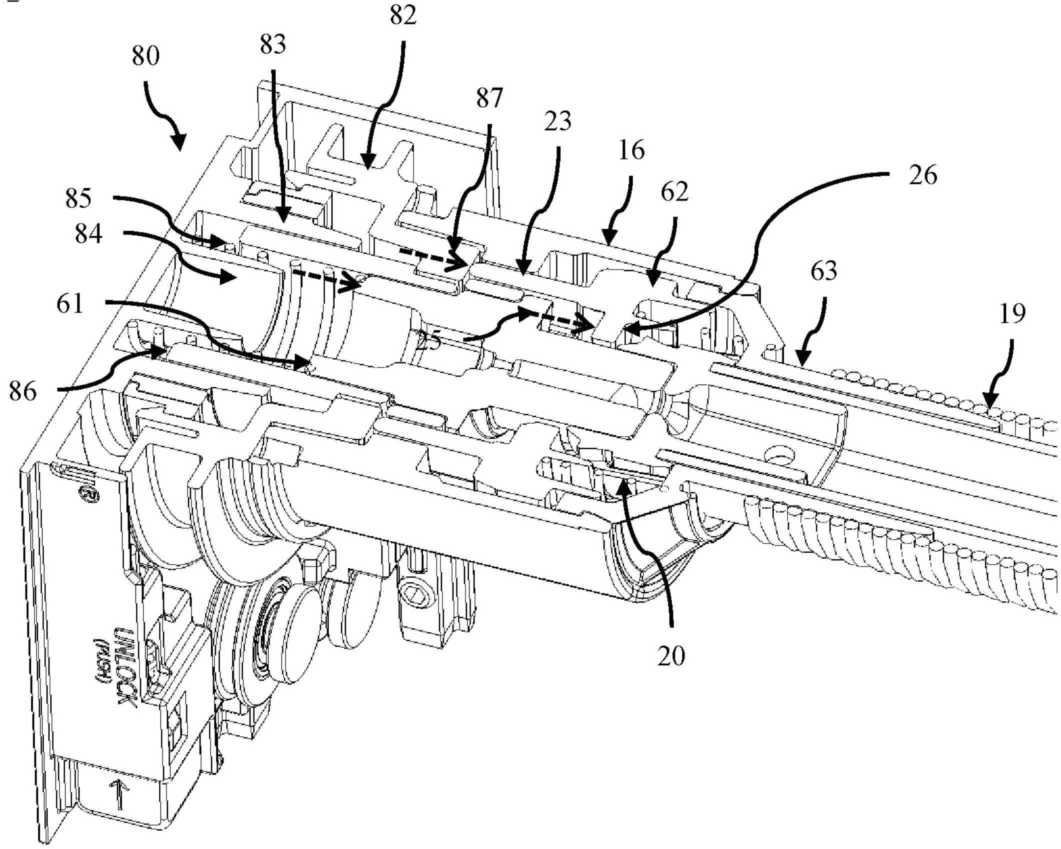
FIG. 4B is a perspective sectional view of the spring assist assembly of FIG. 3A mounted in a corner bracket according to an embodiment.

FIGS. 4A and 4B are a side and perspective sectional view of the spring assist assembly of FIG. 3A mounted in a corner bracket 80 incorporating a cord pulley 82 according to an embodiment. In this embodiment a cord pulley 82 is mounted in the bracket via a bearing arrangement supported by an outer mounting projection 83. A spring 85 is mounted over an inner mounting projection 84, and a stub torque shaft 86 is mounted over the spring 85 and between the inner and outer mounting projections 83, 84. The cord pulley 82 further comprises an annular tube mounting projection with external splines that will mate and key into ribs on the inside of the tube adapter 16 supporting roller tube (not shown). The stub torque shaft 86 engages with the inner side of the annular tube mounting projection 87 and the spring 85 biases the stub torque shaft 86 and cord pulley 82 distal of the corner bracket. When the tube adapter is mounted over the cord pulley, interior of the stub torque shaft 86 comprises splines which will mate and key into the ribs of the torque shaft 61 and restrict any rotation. Further the annular tube mounting projection 87 pushes in (shown by dashed arrows) the ratchet lock projection 23 to release and separate the ratchet mechanism (i.e. separate mating faces 25 and 26), and compression spring 20.

Thus rotation of the cord pulley 82 will rotate the spindle tube whilst the stub torque shaft holds the torque shaft 61 and rigid tube 18 fixed, whilst the tube adapter 16, lock 62, retaining shaft 63 rotate in the direction of the pulley, and thus wind or unwind the torsion spring 19 relative to the fixed torque spindle 65 to counterbalance the changing weight of the screen.

As described above, prior to fitting the roller tube and tube adapter 16 over the cord pulley 82, the ratchet mechanism (i.e. mating faces 25 and 26) is engaged, and the torsion spring 19 can be pre-tensioned by use of a tool such as an Allen key to drive rotation of the rigid tube 18 and fixed torque spindle 65 relative to the tube adapter 16 and retaining shaft 63. This pre-tension is then held whilst the roller tube is fitted into the corner bracket.

This provides a compact pre-tensioning arrangement that has fewer parts than prior art systems and does not require the roller tube to be fitted with internal splines (although in some embodiments this could be implemented).

The benefits of this embodiment are that it allows pre-tension to be applied and self-retained when fitted inside a compatible splined tube 112. Further it simplifies the install process by removing the need for technical knowledge and training to set and install pre-tension. It only requires very basic instruction on how to set and release the tension. Further the spring assist will retain set pre-tension unless removed from compatible splined tube 112. This embodiment also incorporate a ratchet mechanism configured to release the ratchet when in operation. The design of this ratchet mechanism allows unrestricted rotations enabling unrestricted application of tension making the system suitable for even large screens and blinds with long drops. This is in contrast to the system described in U.S. Pat. No. 10,138,676B2 which uses a screw threaded shaft, and so the number of operational rotations is restricted by the length of the thread placing an upper limit on the maximum size or drop height of the screen or blind.

Figure 5A:
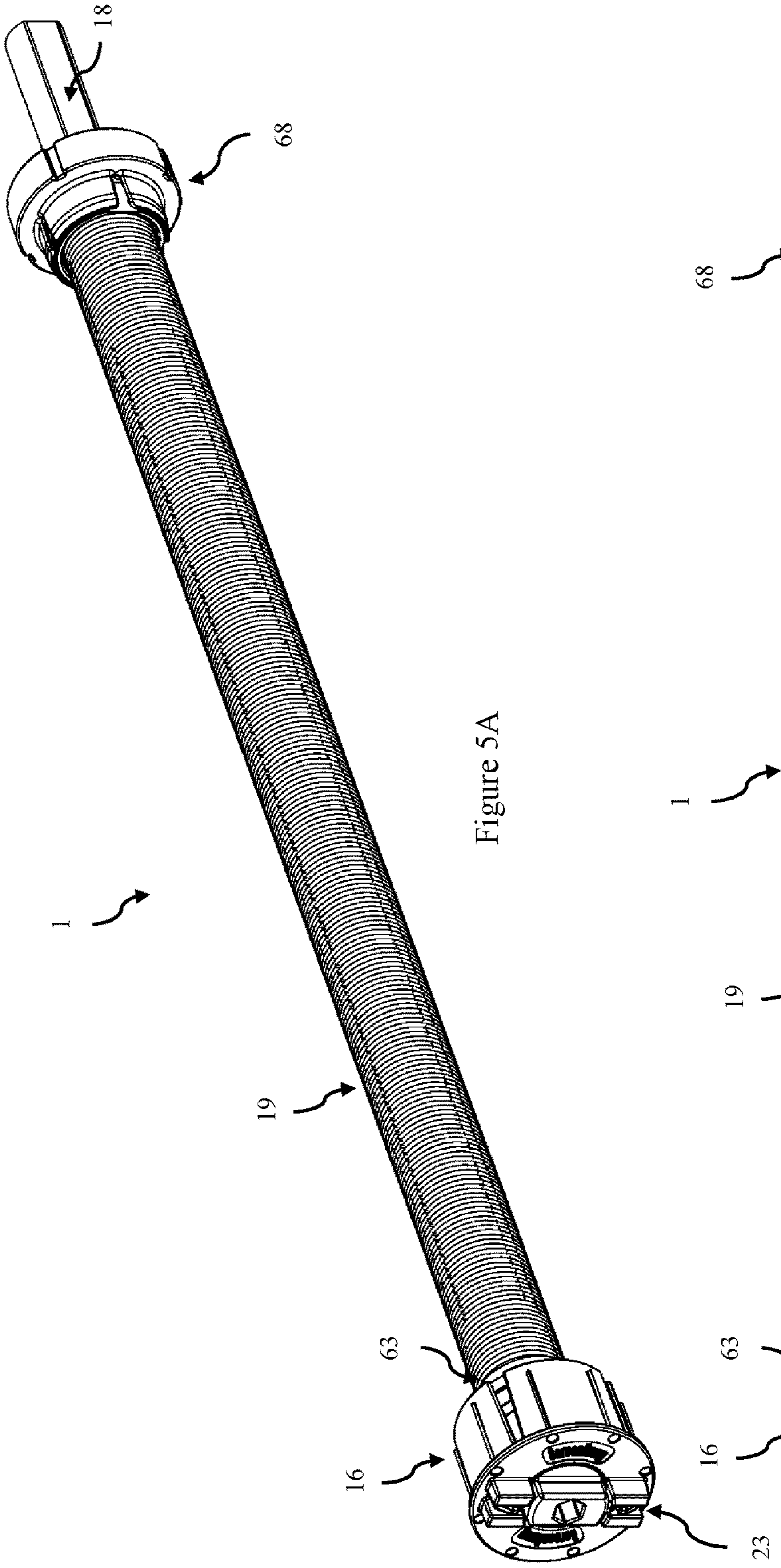
FIG. 5A is an isometric view of the spring assist assembly according to another embodiment.
Figure 5B:
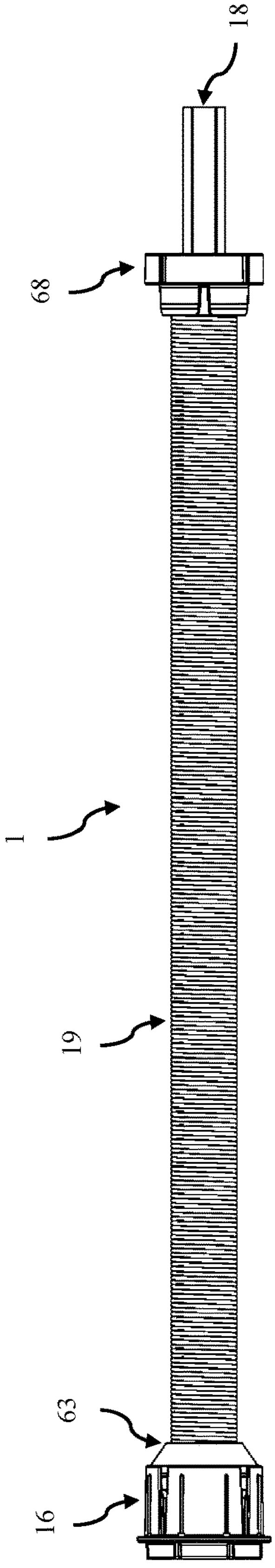
FIG. 5B is a side view of the spring assist assembly of FIG. 5A.
Figure 5C:
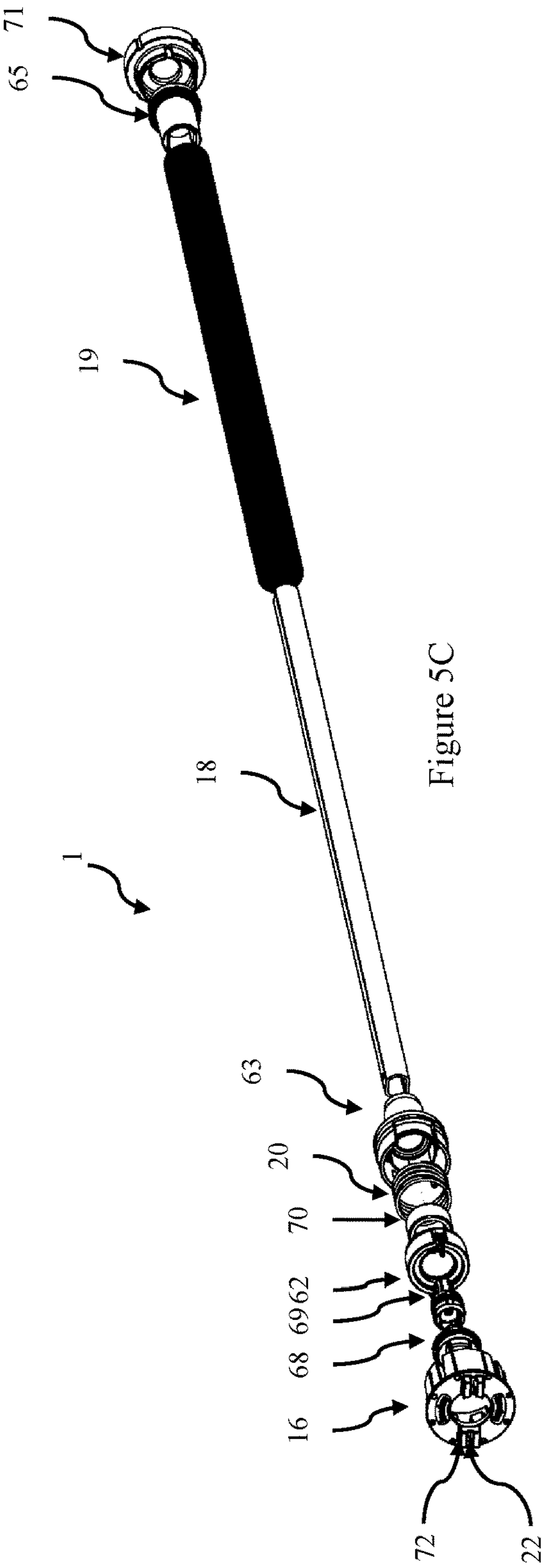
FIG. 5C is an exploded perspective view of the spring assist assembly of FIG. 5A.
Figure 5D:
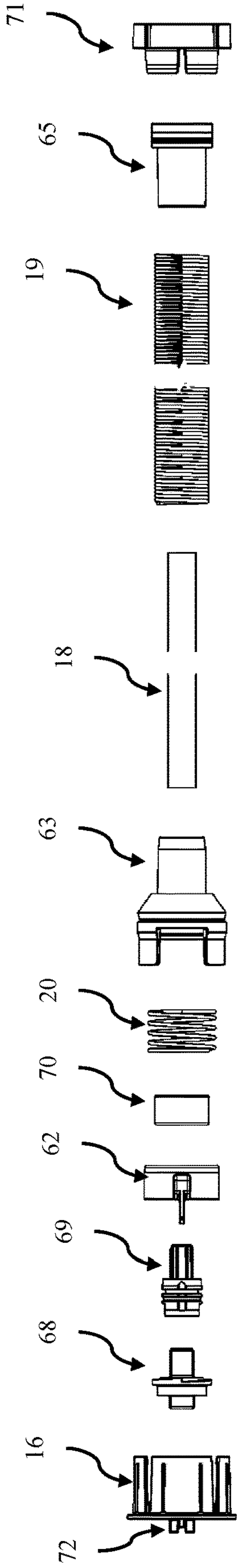
FIG. 5D is an exploded side view of the spring assist assembly of FIG. 5A.
Figure 5E:
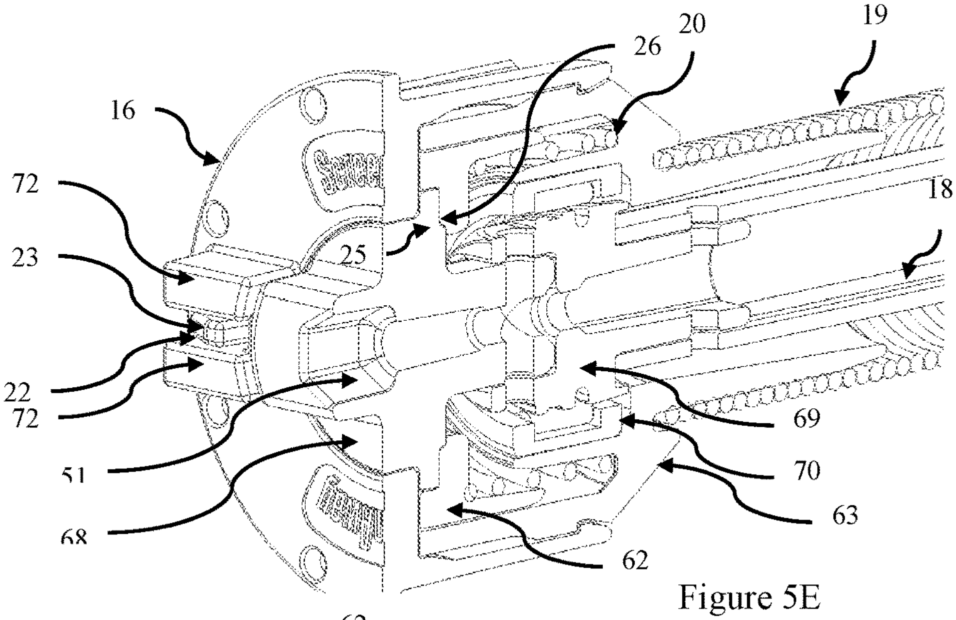
FIG. 5E is a perspective sectional view through a first end of the spring assist assembly of FIG. 5A.
Figure 5F:
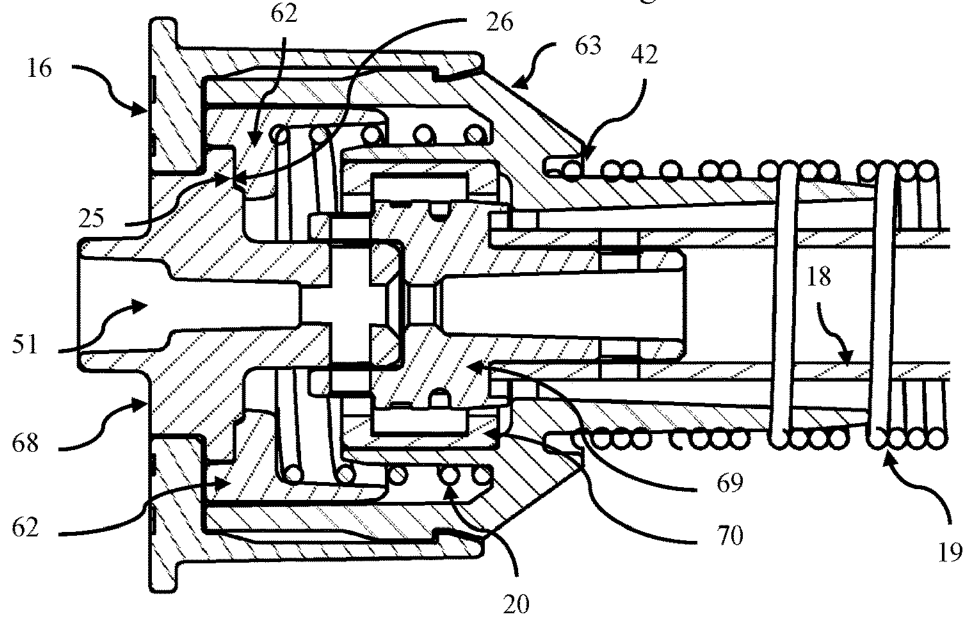
FIG. 5F is a sectional view of a first end of the spring assist assembly of FIG. 5A.
Figure 5G:
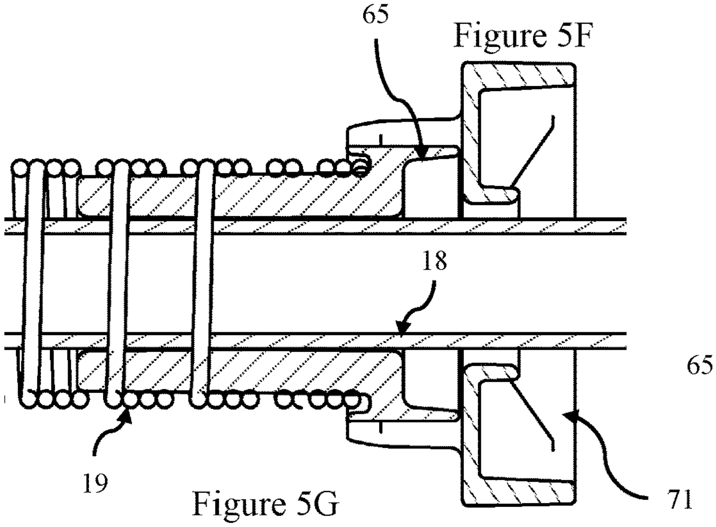
FIG. 5G is a sectional view of a second end of the spring assist assembly of FIG. 5A.
Figure 5H:
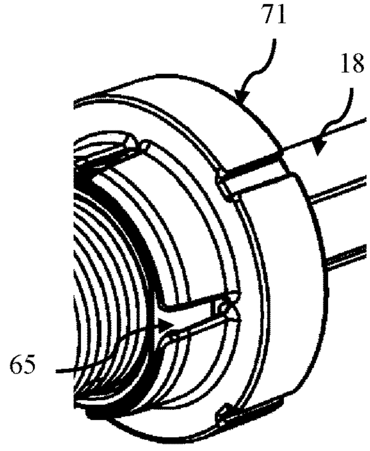
FIG. 5H is a close up perspective view of the torque spindle component shown in FIG. 5D.

FIGS. 5A to 5H show another embodiment of a spring assist assembly based on the embodiment shown in FIGS. 3A to 3H and which incorporates a roller bearing and a modified arrangement for engaging with the corner bracket. FIGS. 5A and 5B are an isometric and side view of the spring assist assembly. FIGS. 5C and 5D are an exploded perspective and side view of the spring assist assembly of FIG. 5A. FIG. 5E is a perspective sectional view through a first end of the spring assist assembly of FIG. 5A. FIG. 5F is a sectional view of a first end of the spring assist assembly of FIG. 5A. FIG. 5G is a sectional view of a second end of the spring assist assembly of FIG. 5A. FIG. 5H is a close up perspective view of the torque spindle component shown in FIG. 5D.

This third embodiment is based upon the embodiment shown in FIGS. 3A to 3H but incorporates a roller bearing which has led to a number of part changes/modifications. The previous torque shaft 61 and joiner 67 have been replaced with a new torque shaft 68 and a joiner 69 around which is located a ball bearing 70 to provide smoother operation, but is otherwise functionally equivalent to the arrangement used in the second embodiment. The linkage is again provided by joiner 69. As in the second embodiment the drive end is again located at the proximal end to rotationally connect the drive and the tube adapter 16 without the need for the external tube 112, although one may be used. In this embodiment the proximal spring anchor is again provided on retaining shaft 63 and the distal spring anchor is provided by the torque spindle 65. In this embodiment an idle spacer 71 is located over the torque spindle 65 to support an external tube 112, and allows the idle spacer to rotate relative to the torque spindle 65. Additionally a modified arrangement is used for engaging with the corner bracket.

The torque shaft 68 is connected inline to, and drives, the joiner 69, the rigid tube 18, and the torque spindle 65, which in turn rotates one end of the torsion spring 19, adjusting pre-tension. As in the second embodiment the mating faces between the torque shaft 68 and the ratchet lock 62 are shaped to create a ratchet mechanism. The compression spring 20, provides a constant spring tension to the ratchet mechanism to ensure that any added tension is retained in the system. The ratchet lock 62 is keyed into both the retaining shaft 63, and the tube adapter 16. When in use, the tube adapter 16 is keyed into a compatible splined tube to ensure that they rotate together, and the torque shaft 68 is keyed into an external compatible stationary part, while the ratchet lock 62 is pushed inwards against the compression spring 20 by an external compatible part, releasing the ratchet mechanism and allowing the spring tension to increase or decrease as the tube adapter 16 rotates. To add pre-tension, a key, such as an Allen key is inserted into key aperture 51 and is used to rotate the torque shaft 68 clockwise. To decrease tension, the lock 62 is pushed in while a key is used to rotate the torque shaft 68 counter-clockwise. Alternatively, the torque spindle 65 can be removed from the rigid tube 18 to reset the pre-tension to zero.

As before, the embodiment retains the benefits of the previous embodiment, as it allows pre-tension to be applied and fully self-retained with no external assistance, and does not require a splined tube 112. Further it simplifies the install process by removing the need for technical knowledge and training to set and install pre-tension compared to the first embodiment. It only requires very basic instruction on how to set and release the tension. This version also has fewer parts assisting in reducing costs and complexity. Also, like the first and second embodiment, this embodiment allows unrestricted rotations enabling applying of tension for even large screens and blinds (i.e. unlike some prior art systems there is no limitation on the drop length of the screens and blinds).

The spring assist may be assembled as follows. Ratchet lock 62 is slipped over torque shaft 68. Joiner 69 is interference fit into a mating drive on torque shaft 68. Compression spring 20 is slipped over joiner 69, and located against the ratchet lock 62. The ball bearing 70 is placed over the joiner 69. The rigid tube 18 is interference fit onto a mating drive on the joiner 69. The torsion spring 19 is attached on one end to the retaining shaft 63 and to the torque spindle 65 on the opposite end. The retaining shaft 63, torsion spring 19, torque spindle 65, and idle spacer 71 are slipped over the rigid tube 18, with the torque spindle 65 keying onto the rigid tube 18, mating rotation but allowing axial movement. The retaining shaft 63 is located against the compression spring 20, keyed into the ratchet lock 62, and clipped over the joiner 69, locking the assembly together axially. The tube adapter 16 is slipped over the torque shaft 61 and clipped over the retaining shaft 63, while the ratchet lock 62 locates into the tube adapter 16.

Figure 6A:
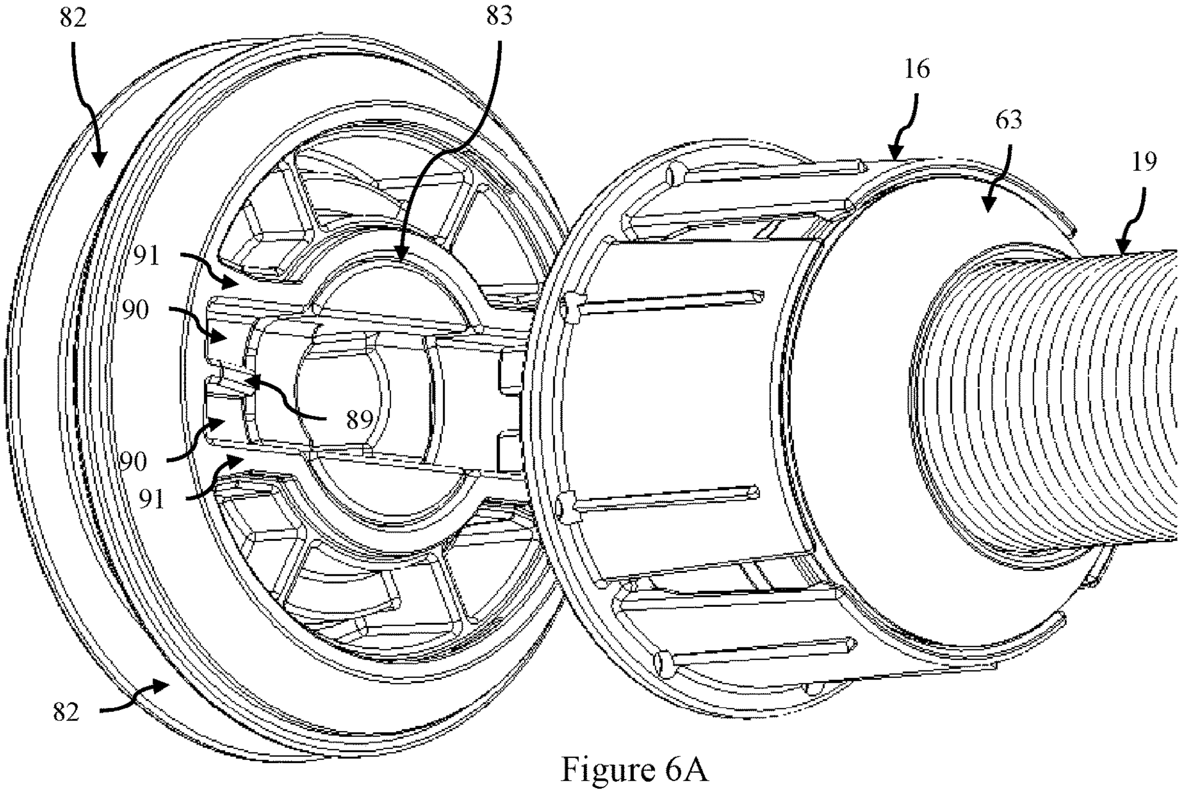
FIG. 6A is a first side perspective view of the spring assist assembly of FIG. 5A prior to mounting to a cord pulley mounted in a corner bracket according to an embodiment.
Figure 6B:
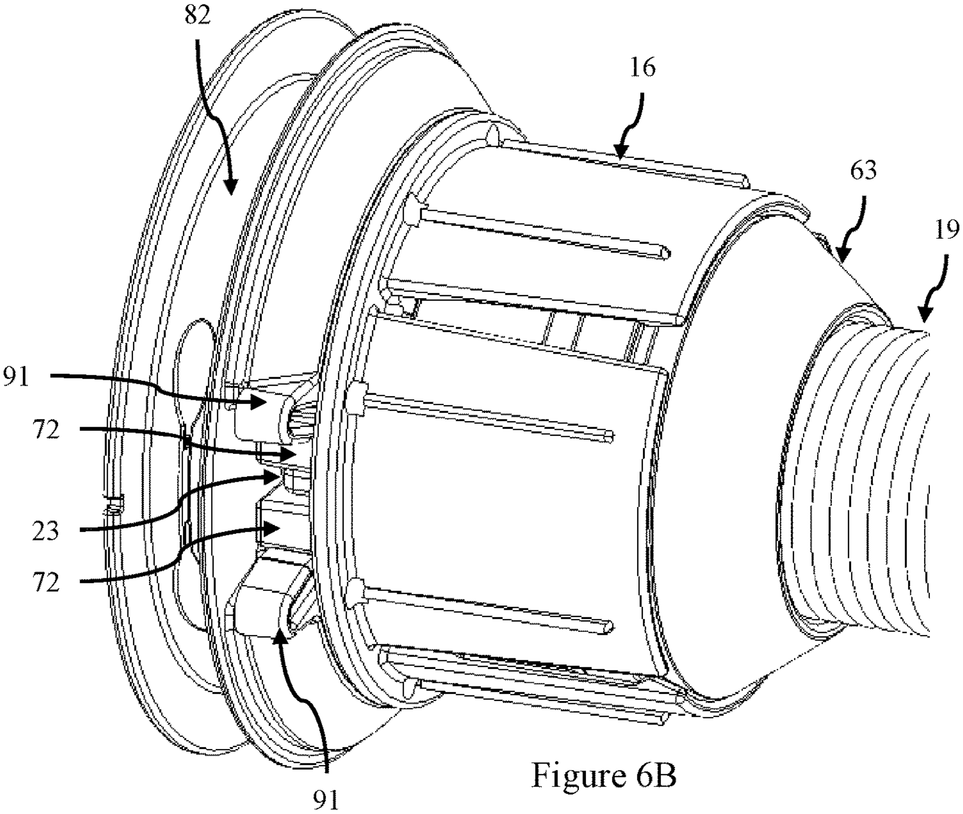
FIG. 6B is a second side perspective view of the spring assist assembly of FIG. 5A after mounting to a cord pulley mounted in a corner bracket according to an embodiment.

In the second embodiment shown in FIGS. 4A and 4B, the pulley 82 is spring loaded (i.e. the spring force is used to disengage the ratchet lock within the spring assist). In this embodiment the connection between the pulley and ratchet lock has been replaced with a frontal slide in connection. This modified arrangement is shown in FIGS. 6A and 6B which are side perspective views of the spring assist assembly of FIG. 5A prior to and after mounting to a cord pulley 82 mounted in a corner bracket 80 according to an embodiment. In this arrangement the cord pulley 82 is mounted in the bracket via a bearing arrangement 83. An inner wall 91 is located on the distal side of the pulley 82, and forms a pair of receiving cavities 90 which are divided by a projecting wedge component 89 formed on the distal surface of the pulley 82. The proximal side of the tube adapter 16 comprises two pairs of locking projections 72 with each pair comprising a projection located either side of an aperture through which the ratchet lock projection 23 projects. When the tube adapter 16 is fitted to the pulley 82, the pair of locking projections 72 are received by the respective pair of receiving cavities 90, and the fixed wedge 89 engages with the ratchet lock projection 23 to disengage the ratchet lock 62 (by translation in the distal direction). As before rotation of the cord pulley 82 will rotate the spindle tube 112 whilst the torque shaft 68 and rigid tube 18 remain fixed, whilst the tube adapter 16, lock 62, retaining shaft 63 rotate in the direction of the pulley, and thus wind or unwind the torsion spring 19 relative to the fixed torque spindle 65 to counter-balance the changing weight of the screen.

As described above, prior to fitting the roller tube and tube adapter 16 over the cord pulley 82, the ratchet mechanisms 25 and 26 are engaged, and the torsion spring 19 can be pre-tensioned by use of a tool such as an Allen key to drive rotation of the rigid tube 18 and fixed torque spindle 65 relative to the tube adapter 16 and retaining shaft 63. This pre-tension is then held whilst the roller tube is fitted into the corner bracket. This provides a compact pre-tensioning arrangement that has fewer parts than prior art systems and does not require the roller tube to be fitted with internal splines (although in some embodiments this could be implemented).

Embodiments of a spring assist assembly for a roller tube have been described. Embodiments allow the helical spring to be pre-tensioned prior to installation using a ratchet mechanism incorporating a ratchet lock which comprises projections which pass through the tube adapter. When installed in the bracket the projections are displaced to disengage the ratchet mechanism and allow normal operation of the roller screen/blind, in which one end of the helical spring is fixed relative to the other end, so that the tension in the spring can be adjusted to counterbalance the changing weight of the screen (as it is raised or lowered).

The benefits of these embodiments are that it allows pre-tension to be applied and fully self-retained with no external assistance. Further it simplifies the install process by removing the need for technical knowledge and training to set and install pre-tension. It only requires very basic instruction on how to set and release the tension. These embodiments also have fewer parts assisting in reducing costs and complexity. Additionally in some embodiments there is no requirement for the roller tube to be a splined tube. Finally the embodiments allow unrestricted rotations enabling application of tension for very large screens and blinds and thus unlike some prior art systems there is no limitation on the drop length of the screens and blinds that the spring assist assembly may be used with.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

What is claimed is:

1. A spring assist assembly for a roller tube comprising:
a rigid tube having a proximal end and a distal end;
a tube adapter with a proximal end and an outer tubular surface configured for insertion into a proximal end of a roller tube, and the proximal end of the tube adapter comprises a central aperture and one or more peripheral apertures located between the central aperture and the outer tubular surface;
a torque shaft passing through the central aperture of the tube adapter and comprising a drive tool aperture at a proximal end, a shaft at a distal end, and a first mating surface;
a linkage which rigidly connects the distal end of the torque shaft to the proximal end of the rigid tube;
a helical spring located over the rigid tube;
a proximal spring anchor;
a distal spring anchor located over the rigid tube;
a retainer which is rigidly attached to the tube adapter;
a ratchet lock fitted over the shaft of the torque shaft comprising one or more proximal projections which extend through the one or more peripheral apertures in the tube adapter, one or more radial projections which are received in apertures in the retainer and a second mating surface,
wherein
the torque shaft, linkage and rigid tube are configured to rotate relative to the tube adapter and retainer, and the spring assist assembly is configured to allow relative rotation of the proximal spring anchor with respect to the distal spring anchor, and
a ratchet mechanism is provided between the first mating surface of the torque shaft and the second mating surface of the ratchet lock such that when a tool is inserted into the drive tool aperture, driving the tool drives relative rotation of the proximal spring anchor with respect to the distal spring anchor to tension the helical spring, and the ratchet lock is biased to engage with the torque shaft to retain added tension, and
when the spring assist assembly is mounted in a support bracket the proximal end of the roller tube is proximal to the support bracket, the one or more proximal projections of the ratchet lock are displaced in a direction distal of the support bracket to separate the first and second mating surfaces to release the ratchet mechanism to allow the spring tension in the helical spring to increase or decrease as the roller tube rotates with respect to the rigid tube.

2. The spring assist assembly as claimed in claim 1, wherein the spring assist assembly is configured to allow relative rotation of the proximal spring anchor with respect to the distal spring anchor by attaching the proximal spring anchor to the linkage and the distal spring anchor is configured to allow relative rotation of the distal spring anchor with respect to the rigid tube, and the tube adapter and distal spring anchor are configured to key with an inner surface of the roller tube to co-rotate with the roller tube when installed in the roller tube.

3. The spring assist assembly as claimed in claim 2, wherein the rigid tube has a non-circular cross section, and the distal spring anchor has a circular aperture through which the rigid tube passes, the distal spring anchor having a diameter greater than or equal to a largest dimension of the rigid tube so that the rigid tube can rotate with respect to the distal spring anchor.

4. The spring assist assembly as claimed in claim 3, wherein the inner surface of the roller tube comprises a plurality of axially extending splines distributed around a perimeter of the roller tube, and the tube adapter and distal spring anchor comprise a plurality of matching slots to receive the axially extending splines to key the tube adapter and the distal spring anchor to the roller tube.

5. The spring assist assembly as claimed in claim 2, wherein the linkage comprises a joiner and a latch where the joiner is configured to rigidly connect to the distal end of the torque shaft and to a proximal end of the latch, and the proximal end of the latch is configured to receive the rigid tube, and the proximal spring anchor is located on the proximal end of the latch.

6. The spring assist assembly as claimed in claim 1, wherein the spring assist assembly is configured to allow relative rotation of the proximal spring anchor with respect to the distal spring anchor by attaching the proximal spring anchor to the retainer and the distal spring anchor is configured to rotate with the rigid tube.

7. The spring assist assembly as claimed in claim 6, wherein the rigid tube has a non-circular cross section, and the distal spring anchor has a matching non-circular aperture through which the rigid tube passes so that the proximal spring anchor rotates with the rigid tube.

8. The spring assist assembly as claimed in claim 6 wherein the linkage comprises a joiner which is configured to rigidly connect the distal end of the torque shaft to the proximal end of the rigid tube and the rigid tube has a non-circular cross section, and the retainer has a circular aperture through which the rigid tube passes, the retainer having a diameter greater than or equal to a largest dimension of the rigid tube so that the rigid tube can rotate with respect to the retainer.

9. The spring assist assembly as claimed in claim 8, further comprising a ball bearing located between the joiner and retainer.

10. The spring assist assembly as claimed in claim 6, wherein the proximal end of the tube adapter comprises a rim in which the central aperture and the one or more peripheral apertures are located, and one or more pairs of locking projections wherein each pair of locking projections is located adjacent each of the one or more peripheral apertures.

11. The spring assist assembly as claimed in claim 1, wherein the proximal end of the tube adapter comprises a rim, and a proximal end cavity comprising an annular inner wall extending distally from the rim to an inner end surface in which the central aperture and the one or more peripheral apertures are located, and wherein the annular inner wall comprises a plurality of ribs which in use are configured to key the tube adapter to a pulley mounted in the support bracket.

12. A screen system comprising:
- a frame;
- a first support bracket and a second support bracket;
- a roller tube supporting a screen wound onto the roller tube, and mounted on the first support bracket and the second support bracket, and comprising a spring assist assembly comprising:
- a rigid tube having a proximal end and a distal end, wherein the proximal end is proximal with respect to the first support bracket when installed;
- a tube adapter with a proximal end and an outer tubular surface configured for insertion into a proximal end of the roller tube, and the proximal end of the tube adapter comprises a central aperture and one or more peripheral apertures located between the central aperture and the outer tubular surface;
- a torque shaft passing through the central aperture of the tube adapter and comprising a drive tool aperture at a proximal end, a shaft at a distal end, and a first mating surface;
- a linkage which rigidly connects the distal end of the torque shaft to the proximal end of the rigid tube;
- a helical spring located over the rigid tube;
- a proximal spring anchor;
- a distal spring anchor located over the rigid tube;
- a retainer which is rigidly attached to the tube adapter;
- a ratchet lock fitted over the shaft of the torque shaft comprising one or more proximal projections which extend through the one or more peripheral apertures in the tube adapter, one or more radial projections which are received in apertures in the retainer and a second mating surface, wherein the torque shaft, linkage and rigid tube are configured to rotate relative to the tube adapter and retainer, and the spring assist assembly is configured to allow relative rotation of the proximal spring anchor with respect to the distal spring anchor, and a ratchet mechanism is provided between the first mating surface of the torque shaft and the second mating surface of the ratchet lock such that when a tool is inserted into the drive tool aperture when the spring assist assembly is not mounted in the first and second support brackets, driving the tool drives relative rotation of the proximal spring anchor with respect to the distal spring anchor to tension the helical spring, and the ratchet lock is biased to engage with the torque shaft to retain added tension, and when the spring assist assembly is mounted in the first and second support brackets the proximal end of the roller tube is proximal to the first support bracket, the one or more proximal projections of the ratchet lock are displaced in a direction distal of the first support bracket to separate the first and second mating surfaces to release the ratchet mechanism to allow the spring tension in the helical spring to increase or decrease as the roller tube rotates with respect to the rigid tube.

13. The screen system as claimed in claim 12, wherein the proximal end of the tube adapter comprises a rim, and a proximal end cavity comprising an annular inner wall extending distally from the rim to an inner end surface in which the central aperture and the one or more peripheral apertures are located, and wherein the annular inner wall comprises a plurality of ribs which in use are configured to key the tube adapter to a pulley mounted in the first support bracket via a bearing arrangement and the pulley further comprises an annular tube mounting projection with external slots that will mate and key into the ribs on the annular inner wall of the tube adapter, and the annular tube mounting projection is further configured to distally displace the one or more proximal projections of the ratchet lock to release the ratchet mechanism.

14. The screen system as claimed in claim 13, wherein the first support bracket further comprises an outer mounting projection and the bearing arrangement is supported by the outer mounting projection, and the first support bracket further comprises an inner mounting projection and a spring is mounted over the inner mounting projection and distally biases the torque shaft, and a stub torque shaft is mounted over the spring and between the inner and outer mounting projections, such that in use, rotation of the pulley will rotate the roller tube and tube adapter in the direction of the pulley whilst the stub torque shaft holds the torque shaft and rigid tube fixed and thus wind or unwind the helical spring to counterbalance a changing weight of the screen.

15. The screen system as claimed in claim 12, wherein the spring assist assembly is configured to allow relative rotation of the proximal spring anchor with respect to the distal spring anchor by attaching the proximal spring anchor to the retainer and the distal spring anchor is configured to rotate with the rigid tube, and the proximal end of the tube adapter comprises a rim in which the central aperture and the one or more peripheral apertures are located, and one or more pairs of locking projections wherein each pair of locking projections is located adjacent each of the one or more peripheral apertures, and the first support bracket comprises a pulley mounted in the first support bracket via a bearing arrangement, and the pulley further comprises an inner wall located on a distal side of the pulley which forms one or more pairs of receiving cavities which are divided by a projecting wedge component formed on the distal side of the pulley and the one or more pairs of receiving cavities are configured to receive the one or more pairs of locking projections such that the projecting wedge component distally displaces the one or more proximal projections of the ratchet lock to release the ratchet mechanism.

16. The screen system as claimed in claim 12, wherein the spring assist assembly is configured to allow relative rotation of the proximal spring anchor with respect to the distal spring anchor by attaching the proximal spring anchor to the linkage and the distal spring anchor is configured to allow relative rotation of the distal spring anchor with respect to the rigid tube, and the tube adapter and distal spring anchor are configured to key with an inner surface of the roller tube to co-rotate with the roller tube when installed in the roller tube.

17. The screen system as claimed in claim 16, wherein the rigid tube has a non-circular cross section, and the distal spring anchor has a circular aperture through which the rigid tube passes, the distal spring anchor having a diameter greater than or equal to a largest dimension of the rigid tube so that the rigid tube can rotate with respect to the distal spring anchor.

18. The screen system as claimed in claim 17, wherein the inner surface of the roller tube comprises a plurality of axially extending splines distributed around a perimeter of the roller tube, and the tube adapter and distal spring anchor comprise a plurality of matching slots to receive the axially extending splines to key the tube adapter and the distal spring anchor to the roller tube.

19. The screen system as claimed in claim 16, wherein the linkage comprises a joiner and a latch where the joiner is configured to rigidly connect to the distal end of the torque shaft and to a proximal end of the latch, and the proximal end of the latch is configured to receive the rigid tube, and the proximal spring anchor is located on the proximal end of the latch.

20. The screen system as claimed in claim 12, wherein the spring assist assembly is configured to allow relative rotation of the proximal spring anchor with respect to the distal spring anchor by attaching the proximal spring anchor to the retainer and the distal spring anchor is configured to rotate with the rigid tube.

* * * * *